United States Patent
Stirling-Gallacher et al.

(10) Patent No.: US 10,912,085 B2
(45) Date of Patent: Feb. 2, 2021

(54) SYSTEM AND METHOD FOR BACKHAUL AND ACCESS IN BEAMFORMED COMMUNICATIONS SYSTEMS

(71) Applicant: Futurewei Technologies, Inc., Plano, TX (US)

(72) Inventors: Richard Stirling-Gallacher, San Diego, CA (US); Hongcheng Zhuang, Shenzhen (CN); Lili Zhang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/444,468

(22) Filed: Jun. 18, 2019

(65) Prior Publication Data

US 2019/0306858 A1    Oct. 3, 2019

Related U.S. Application Data

(62) Division of application No. 15/647,912, filed on Jul. 12, 2017, now abandoned.

(51) Int. Cl.
*H04W 72/04*     (2009.01)
*H04W 16/28*     (2009.01)
*H04W 72/08*     (2009.01)

(52) U.S. Cl.
CPC ....... *H04W 72/0446* (2013.01); *H04W 16/28* (2013.01); *H04W 72/048* (2013.01); *H04W 72/082* (2013.01); *H04W 72/046* (2013.01); *H04W 72/0453* (2013.01)

(58) Field of Classification Search
CPC ............. H04W 72/0446; H04W 16/28; H04W 72/048; H04W 72/082; H04W 72/0453; H04W 72/046
See application file for complete search history.

(56) References Cited

U.S. PATENT DOCUMENTS

| | | | | |
|---|---|---|---|---|
| 8,855,062 | B2 * | 10/2014 | Khandekar | ........... H04W 99/00 370/329 |
| 8,862,176 | B2 | 10/2014 | Sirotkin et al. | |
| 2010/0080139 | A1 | 4/2010 | Palanki et al. | |

(Continued)

FOREIGN PATENT DOCUMENTS

| | | |
|---|---|---|
| CN | 104885378 A | 9/2015 |
| CN | 105191470 A | 12/2015 |

OTHER PUBLICATIONS

Kela, et al., "Flexible Backhauling With Massive MIMO for Ultra-Dense Networks," IEEE Access, vol. 4, Jan. 27, 2017, pp. 9625-9634.

(Continued)

*Primary Examiner* — Peter P Chau
(74) *Attorney, Agent, or Firm* — Slater Matsil, LLP

(57) ABSTRACT

A method for performing beamformed backhaul communications includes determining first formats of subframes supporting access communications between the first TRP and user equipments (UEs) served by the first TRP, determining a subset of the subframes supporting access communications, the subset of the subframes supports backhaul communications between the first TRP and a second TRP, and communicating with a UE over an access link in accordance with the subset of subframes.

20 Claims, 15 Drawing Sheets

(56) References Cited

U.S. PATENT DOCUMENTS

| | | |
|---|---|---|
| 2010/0080166 A1* | 4/2010 | Palanki ............... H04B 7/2606 |
| | | 370/315 |
| 2010/0103860 A1 | 4/2010 | Kim et al. |
| 2011/0243060 A1 | 10/2011 | Mildh et al. |
| 2011/0249611 A1 | 10/2011 | Khandekar et al. |
| 2013/0040558 A1 | 2/2013 | Kazmi |
| 2013/0053078 A1 | 2/2013 | Barbieri et al. |
| 2013/0267222 A1 | 10/2013 | Park et al. |
| 2014/0204846 A1 | 7/2014 | Maltsev et al. |
| 2014/0206368 A1 | 7/2014 | Maltsev et al. |
| 2014/0307586 A1 | 10/2014 | Zhang et al. |
| 2014/0307591 A1* | 10/2014 | Wang ............... H04W 72/1231 |
| | | 370/278 |
| 2016/0127090 A1 | 5/2016 | Takeda et al. |
| 2016/0183232 A1 | 6/2016 | Stirling-Gallacher et al. |
| 2017/0064731 A1 | 3/2017 | Wang et al. |
| 2017/0180028 A1 | 6/2017 | Maltsev et al. |

OTHER PUBLICATIONS

Li, et al., "Feasibility Study on Full-Duplex Wireless Millimeter-Wave Systems," 2014 IEEE International Conference on Acoustic, Speech and Signal Processing (ICASSP), May 4-9, 2014, pp. 2788-2792.

Samsung, "Dynamic resource allocation for Integrated Access and Backhaul," 3GPP TSG RAN WG1 NR Ad-Hoc#2, R1-1711614, Agenda Item 8.2, Qingdao, China, Jun. 27-30, 2017, 3 pages.

Taori, et al., "Point-to-Multipoint In-Band mmWave Backhaul for 5G Networks," IEEE Communications Magazine, Jan. 2015, pp. 195-201.

\* cited by examiner

1) EXAMPLES WHEN ACCESS USES ANOTHER FREQUENCY BAND
(I.E. TRADITIONAL LTE-A BELOW 6GHZ)

| UL-DL FORMAT | DL-UL SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | ~~D~~ | ~~S~~ | ~~U~~ | ~~U~~ | ~~U~~ | ~~D~~ | ~~S~~ | ~~U~~ | ~~U~~ | ~~U~~ |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | ~~D~~ | ~~S~~ | ~~U~~ | ~~D~~ | ~~D~~ | ~~D~~ | ~~D~~ | ~~D~~ | ~~D~~ | ~~D~~ |
| 6 | 5 MS | D | S | U | U | U | D | S | U | U | D |

THE CHOICE OF SOME TDD FRAME FORMATS FOR ACCESS MAY BE RESTRICTED

*Fig. 6*

| UL-DL FORMAT | DL-UL SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

FORMATS WITH TWO SUBFRAMES THAT ARE DIFFERENT (ONE IN EACH DIRECTION)

*Fig. 8A*

| UL-DL FORMAT | DL-UL SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

FORMATS WITH FIVE SUBFRAMES THAT ARE DIFFERENT (ALL IN SAME DIRECTION)

| NEIGHBORING TRPS IN-BAND BACKHAUL CAPABILITY | | | RESTRICTIONS FOR BACKHAUL AND TDD FRAME FOR ACCESS |
|---|---|---|---|
| SDM CAPABLE | FULL DUPLEX CAPABLE (ACCESS/BACKHAUL) WITHIN SAME SECTOR | FULL DUPLEX CAPABLE ACROSS DIFFERENT SECTORS (ACCESS/BACKHAUL) | |
| ALL CAPABLE | ALL CAPABLE | ALL CAPABLE | NO RESTRICTION. |
| ALL CAPABLE | ONE TRP IS NOT CAPABLE | ALL CAPABLE | SDMA IAB LIMITED TO TDD ACCESS FRAME FOR NON-CAPABLE TRP. |
| ALL CAPABLE | ONE TRP IS NOT CAPABLE | ONE TRP IS NOT CAPABLE | SDMA IAB LIMITED TO TDD ACCESS FRAME FOR NON-CAPABLE TRP. THE TRP CAN ONLY TRANSMIT/RECEIVE FROM ALL NEIGHBORS AT SAME TIME. |
| ALL CAPABLE | BOTH TRPS ARE NOT CAPABLE | - | SDMA IAB LIMITED CONFLICT SUBFRAMES OF NEIGHBORING TRPS. ADDITIONAL RESTRICTIONS MAY OCCUR IF SOME TRPS ARE NOT ADJACENT SECTORS FULL DUPLEX CAPABLE |
| NOT CAPABLE | - | ONE TRP IS NOT CAPABLE | CAUSES RESTRICTIONS FOR TDM FOR NON CAPABLE TRP. |

SYSTEM AND METHOD FOR BACKHAUL AND ACCESS IN BEAMFORMED COMMUNICATIONS SYSTEMS

CROSS-REFERENCE TO RELATED APPLICATIONS

This application is a divisional of U.S. patent application Ser. No. 15/647,912, filed on Jul. 12, 2017, which application is hereby incorporated herein by reference.

TECHNICAL FIELD

The present disclosure relates generally to a system and method for digital communications, and, in particular embodiments, to a system and method for backhaul and access in beamformed communications systems.

BACKGROUND

In communications systems, the term backhaul or backhaul links refers to links of a communications system that provide interconnectivity between core network entities, such as access nodes, communications controllers, mobility entities, gateways, service providers, and so on. In other words, the backhaul links do not include links that provide connectivity to the user equipment (UE). A fronthaul is similar to a backhaul and includes links between communications controllers to remote radio heads (RRHs). On the other hand, the term access or access links refers to links of a communications system that provides interconnectivity between UEs and access nodes. More simply, access refers to links that connect the UEs to the core network entities of the communications system.

Future wireless communications systems are operating at ever higher carrier frequencies in a quest to find greater bandwidth and less interference. These wireless communications systems may operate at frequencies of 6 GHz and above, such as millimeter (mmWave) frequencies. In order to fully utilize the greater bandwidth available in the wireless communications systems, transmission-reception points (TRPs) may require more bandwidth and less latency than what is afforded in existing backhaul and/or fronthaul links. Furthermore the density of the TRPs is likely to be much higher than current deployments and the cost of laying wireline high capacity backhaul connections to all of these TRPs can be prohibitive. Additionally, in certain situations some TRPs may be temporal in nature or mobile and may not be able to support a wireline connection.

Therefore, there is a need for systems and methods that support backhaul and access in beamformed communications systems.

SUMMARY

Example embodiments provide a system and method for backhaul and access in beamformed communications systems.

In accordance with an example embodiment, a method for performing beamformed backhaul communications is provided. The method includes determining, by a first transmit-receive point (TRP), first formats of subframes supporting access communications between the first TRP and user equipments (UEs) served by the first TRP, determining, by the first TRP, a subset of the subframes supporting access communications, the subset of the subframes supports backhaul communications between the first TRP and a second TRP, and communicating, by the first TRP, with a UE over an access link in accordance with the subset of the subframes.

Optionally, in any of the preceding embodiments, the method further comprises communicating, by the first TRP, with the second TRP in accordance with the first formats.

Optionally, in any of the preceding embodiments, the method further comprises providing, by the first TRP, a first TRP capability to a network entity determining formats of subframes supporting access communications and formats of subframes supporting backhaul communications.

Optionally, in any of the preceding embodiments, the method further comprises providing to a network entity determining formats of subframes supporting access communications and formats of subframes supporting backhaul communications, by the first TRP, first requested formats of subframes supporting access communications between the first TRP and the UEs served by the first TRP.

Optionally, in any of the preceding embodiments, the method further comprises receiving, by the first TRP, a second TRP capability of the second TRP, and providing to a network entity determining formats of subframes supporting access communications and formats of subframes supporting backhaul communications, by the first TRP, the second TRP capability of the second TRP.

Optionally, in any of the preceding embodiments, the method further comprises receiving, by the first TRP, second requested formats of subframes supporting access communications between the second TRP and UEs served by the second TRP, and providing, by the first TRP, the second requested formats to the network entity.

Optionally, in any of the preceding embodiments, wherein determining the first formats and the subset of the subframes includes one of retrieving the first formats and the subset of the subframes from a memory, receiving the first formats and the subset of the subframes from a network entity determining formats of subframes supporting access communications and formats of subframes supporting backhaul communications, or receiving the first formats and the subset of the subframes from a third TRP.

Optionally, in any of the preceding embodiments, wherein each format in the first formats indicates an allocation of one of a first type of subframe of a radio frame to convey uplink access data, or a second type of subframe of the radio frame to convey downlink access data.

Optionally, in any of the preceding embodiments, wherein the subset of the subframes indicates at least one subframe of the first type or the second type of subframes to convey backhaul data.

In accordance with an example embodiment, a method for supporting beamformed backhaul communications is provided. The method includes selecting, by a network entity, first formats of first subframes supporting access communications at a first TRP in accordance with TRP capabilities of the first TRP, selecting, by the network entity, second formats of second subframes supporting access communications at a second TRP in accordance with TRP capabilities of the second TRP, selecting, by the network entity, a subset of the first formats and the second formats for supporting backhaul communications between the first TRP and the second TRP, wherein the subset of the first formats and the second formats is selected in accordance with the TRP capabilities of the first TRP and the second TRP, and signaling, by the network entity, indications of the first formats of the first subframes, the second formats of the second subframes, and the subset of the first formats and the second formats to the first TRP and the second TRP.

Optionally, in any of the preceding embodiments, wherein the TRP capabilities comprises at least one of self-interference cancellation capability, or integrated access and backhaul (IAB) capability.

Optionally, in any of the preceding embodiments, wherein selecting the subset of the first formats and the second formats is also in accordance with at least one of first requested formats of subframes supporting access communications of the first TRP or second requested formats of subframes supporting access communications of the second TRP.

Optionally, in any of the preceding embodiments, wherein selecting the first formats is also in accordance with first requested formats of subframes supporting access communications of the first TRP, and wherein selecting the second formats is also in accordance with second requested formats of subframes supporting access communications of the second TRP.

Optionally, in any of the preceding embodiments, wherein the first and second TRPs are self-interference cancellation capable within a single sector, and wherein the subset of the first formats and the second formats comprises all formats of the first and second formats.

Optionally, in any of the preceding embodiments, wherein one of the first or second TRPs is self-interference cancellation incapable within a single sector, and wherein the subset of the first formats and the second formats comprises formats that correspond to the one of the first or second TRPs that is self-interference cancellation incapable.

Optionally, in any of the preceding embodiments, wherein the first and second TRPs are self-interference cancellation incapable within a single sector, and wherein the subset of the first formats and the second formats comprises conflicting formats of the first and second formats.

Optionally, in any of the preceding embodiments, wherein the TRP capability further comprises access and backhaul multiplexing in at least one of a time domain, a frequency domain, or a space domain.

In accordance with an example embodiment, first TRP is provided. The first TRP includes one or more processors, and a computer readable storage medium storing programming for execution by the one or more processors. The programming including instructions to configure the first TRP to determine first formats of subframes supporting access communications between the first TRP and UEs served by the first TRP, determine a subset of the subframes supporting access communications, the subset of the subframes supports backhaul communications between the first TRP and a second TRP, and communicate with a UE over an access link in accordance with the subset of the subframes.

Optionally, in any of the preceding embodiments, wherein the programming includes instructions to configure the first TRP to communicate with the second TRP in accordance with the first formats.

Optionally, in any of the preceding embodiments, wherein the programming includes instructions to configure the first TRP to provide a first TRP capability to a network entity determining formats of subframes supporting access communications and formats of subframes supporting backhaul communications.

Optionally, in any of the preceding embodiments, wherein the programming includes instructions to configure the first TRP to provide to a network entity determining formats of subframes supporting access communications and formats of subframes supporting backhaul communications, first requested formats of subframes supporting access communications between the first TRP and the UEs served by the first TRP.

Optionally, in any of the preceding embodiments, wherein the programming includes instructions to configure the first TRP to receive a second TRP capability of the second TRP, and provide to a network entity determining formats of subframes supporting access communications and formats of subframes supporting backhaul communications, the second TRP capability of the second TRP.

Optionally, in any of the preceding embodiments, wherein the programming includes instructions to configure the first TRP to receive second requested formats of subframes supporting access communications between the second TRP and UEs served by the second TRP, and provide the second requested formats to the network entity.

Optionally, in any of the preceding embodiments, wherein the programming includes instructions to configure the first TRP to one of retrieve the first formats and the subset of the subframes from a memory, receive the first formats and the subset of the subframes from a network entity determining formats of subframes supporting access communications and formats of subframes supporting backhaul communications, or receive the first formats and the subset of the subframes from a third TRP.

In accordance with an example embodiment, a network entity is provided. The network entity includes one or more processors, and a computer readable storage medium storing programming for execution by the one or more processors. The programming including instructions to configure the network entity to select first formats of first subframes supporting access communications at a first TRP in accordance with TRP capabilities of the first TRP, select second formats of second subframes supporting access communications at a second TRP in accordance with TRP capabilities of the second TRP, select a subset of the first formats and the second formats for supporting backhaul communications between the first TRP and the second TRP, wherein the subset of the first formats and the second formats is selected in accordance with the TRP capabilities of the first TRP and the second TRP, and signal indications of the first formats of the first subframes, the second formats of the second subframes, and the subset of the first formats and the second formats to the first TRP and the second TRP.

Optionally, in any of the preceding embodiments, wherein the first and second TRPs are self-interference cancellation capable within a single sector, and wherein the subset of the first formats and the second formats comprises all formats of the first and second formats.

Optionally, in any of the preceding embodiments, wherein one of the first or second TRPs is self-interference cancellation incapable within a single sector, and wherein the subset of the first formats and the second formats comprises formats that correspond to the one of the first or second TRPs that is self-interference cancellation incapable.

Optionally, in any of the preceding embodiments, wherein the first and second TRPs are self-interference cancellation incapable within a single sector, and wherein the subset of the first formats and the second formats comprises conflicting formats of the first and second formats.

Practice of the foregoing embodiments enables the implementation of low latency high bandwidth wireless connections (backhaul and/or fronthaul) between network entities with existing backhaul links (wireline or wireless) and network entities without existing backhaul links. These low latency high bandwidth wireless connections share network resources with access links in an JAB solution. The JAB links may be in-band with the access links.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a table of example TDD frame formats according to example embodiments described herein;

FIG. 8A illustrates a table of example TDD frame formats, highlighting a first TDD frame selection according to example embodiments described herein;

FIG. 8B illustrates a table of example TDD frame formats, highlighting a second TDD frame selection according to example embodiments described herein;

FIG. 11 illustrates a table summarizing different IAB configuration restrictions in accordance with TRP capabilities according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1A:
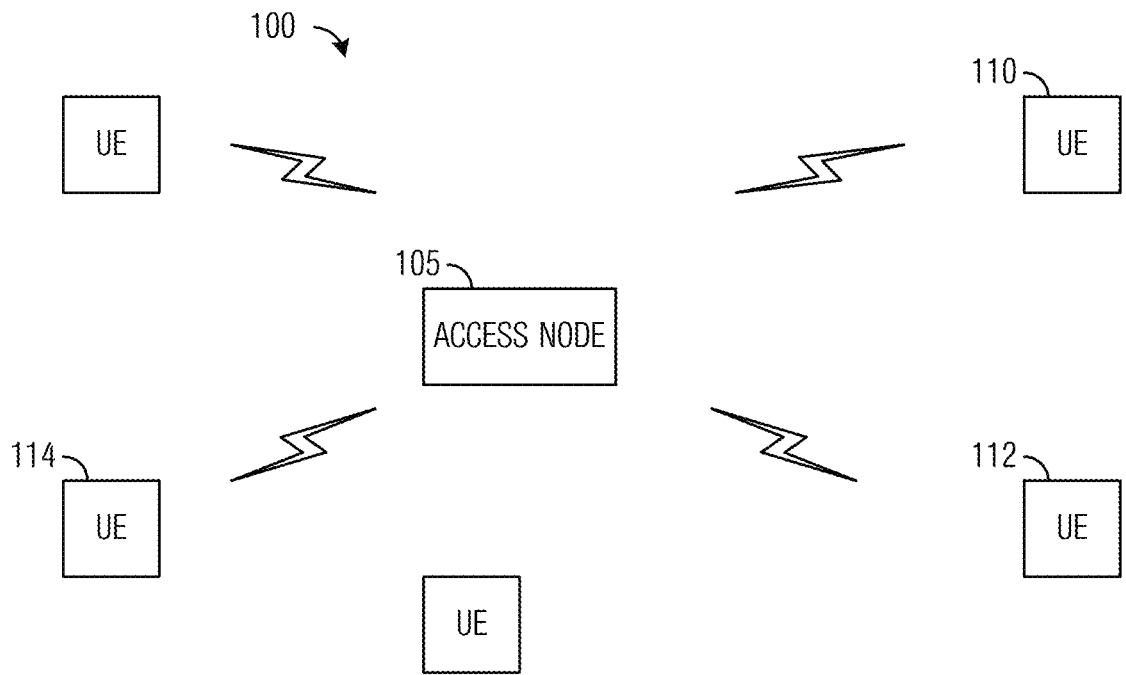
FIG. 1A illustrates an example wireless communications system according to example embodiments described herein.

FIG. 1A illustrates an example wireless communications system 100. Communications system 100 includes an access node 105 serving a plurality of user equipments (UEs), such as UE 110, UE 112, and UE 114. In a first operating mode, transmissions for UEs as well as transmissions by UEs pass through the access node. The access node allocates network resources for the transmissions to or from the UEs. Access nodes may also be commonly referred to as base stations, NodeBs, evolved NodeBs (eNBs), next generation (NG) eNBs (gNBs), master eNBs (MeNBs), secondary eNBs (SeNBs), master gNBs (MgNBs), secondary gNBs (SgNBs), remote radio heads, access points, and the like, while UEs may also be commonly referred to as mobiles, mobile stations, terminals, subscribers, users, stations, and the like. An access node (or an eNB, gNB, remote radio head, access point, and so on) that is serving one or more UEs may be referred to as a serving base station (SBS). A transmission point may be used to refer to any network entity capable of transmitting. Therefore, transmission-reception points (TRP) commonly refer to access nodes, eNBs, gNBs, base stations, NodeBs, MeNBs, SeNBs, MgNBs, SgNBs, remote radio heads (RRHs), access points. In some situations, UEs (and similar devices) may also be operating as TRPs.

While it is understood that communications systems may employ multiple access nodes (or TRPs) capable of communicating with a number of UEs, only one access node, and five UEs are illustrated for simplicity.

A cell is a commonly used term that refers to a coverage area of an access node. Typically, a cell is served by one or more sectors of a sectorized antenna of the access node. Hence, the coverage area of the access node includes a cell partitioned into a plurality of sectors. As an illustrative example, in a scenario where an access node uses a three-sector antenna system, the cell of the access node may be divided into three sectors, with each sector being covered by a separate antenna (with an example beam width of 120 degrees) or a separate part of the total antenna system. As another illustrative example, in a scenario where an access node uses a six-sector antenna system (where each antenna may cover a 60 degree sector, for example), the cell of the access node may be divided into six sectors or three sectors, with each sector being covered by one or two antennas or parts sectors of the antenna system respectively.

Figure 1B:
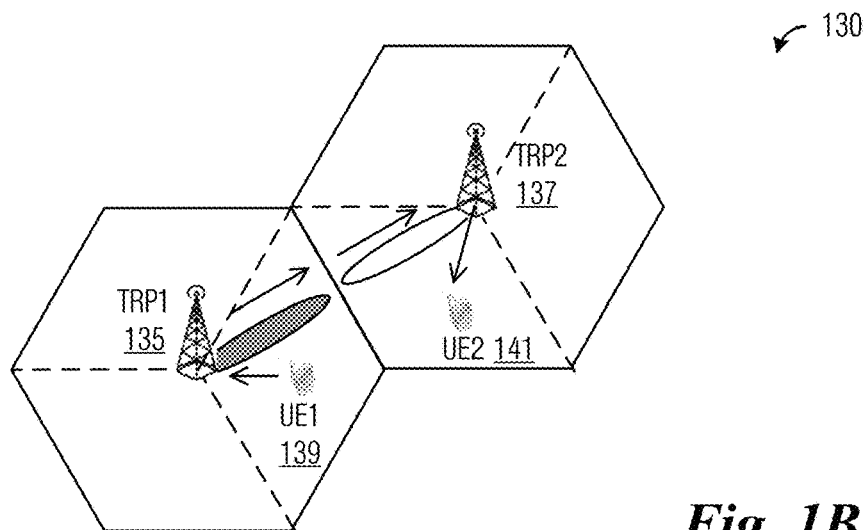
FIG. 1B illustrates a communications system highlighting interference at TRPs due to backhaul links and access links that are located in the same sector while serving UEs by transmitting and receiving in different directions according to example embodiments described herein.

The discussion of interference, as presented herein, focuses on the interference at the TRP due to operating backhaul links and access links transmitting to or receiving from served UEs, with the backhaul and access links being located in the same sector or in different sectors. Interference, when the access links and the backhaul links are in a single sector, occurs when the backhaul and access links are operating in different directions. FIG. 1B illustrates a communications system 130 highlighting interference at TRPs due to backhaul links and access links that are located in the same sector while serving UEs by transmitting and receiving in different directions. Communications system 130 includes a first TRP (TRP1) 135, a second TRP (TRP2) 137, a first UE (UE1) 139, and a second UE (UE2) 141. As shown in FIG. 1B, the access links and the backhaul links are located in the same sector due to the relative positions of TRP1 135 and TRP2 137.

Figure 1C:
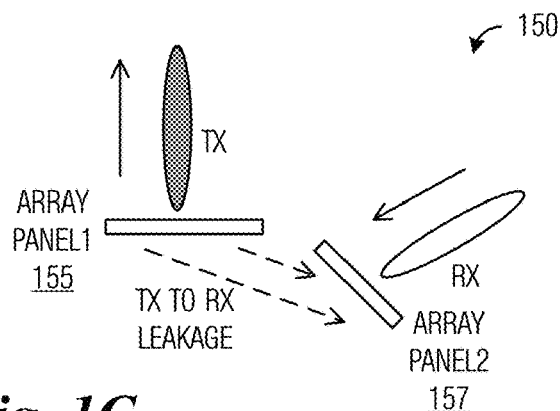
FIG. 1C illustrates a detailed view of an antenna array of a TRP according to example embodiments described herein.
Figure 1D:
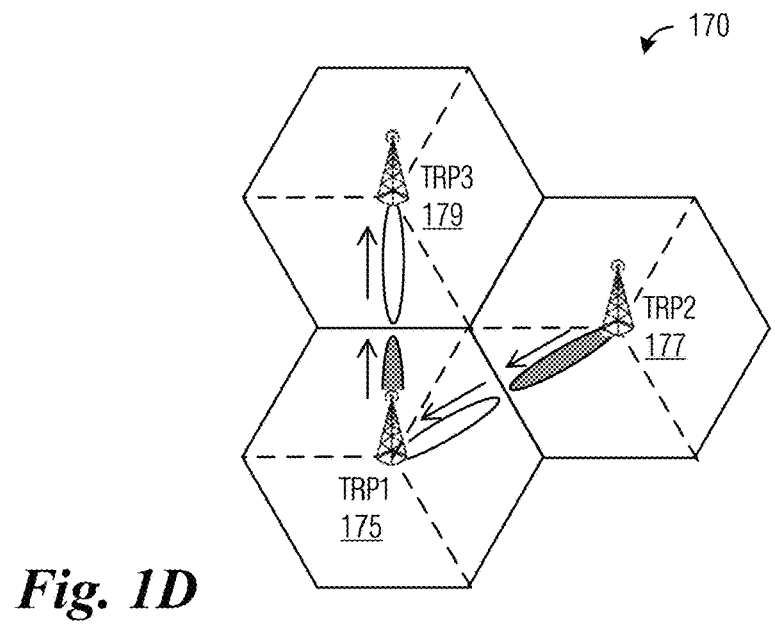
FIG. 1D illustrates a communications system highlighting interference at TRPs due to communications on backhaul links located in different sectors according to example embodiments described herein.

Interference at the TRP, may also occur due to transmitting and receiving on backhaul links operating in different directions of different sectors. FIG. 1C illustrates a detailed view of a set of antenna array panels 150 of a TRP. Set of Antenna array panels 150, as shown in FIG. 1C, includes two array panels; a first panel (array panel1) 155 is oriented at approximately 90 degrees and a second panel (array panel2) 157 that is oriented at approximately 45 degrees. When a transmission occurs at array panel1 155, leakage occurs and a receiver at array panel2 157 receives a portion of the transmission at array panel1 155. FIG. 1D illustrates a communications system 170 highlighting interference at TRPs due to communications on backhaul links located in different sectors. Communications system 170 includes a first TRP (TRP1) 175, a second TRP (TRP2) 177, and a third TRP (TRP3) 179. As shown in FIG. 1D, when TRP1 175 is transmitting to TRP3 179, leakage occurs onto a receiver of TRP1 175 that is also receiving a transmission from TRP2 177. The leakage arising from the transmission between TRP1 175 and TRP3 179 may negatively impact the reception of the transmission between TRP2 177 and TRP1 175.

Figure 2A:
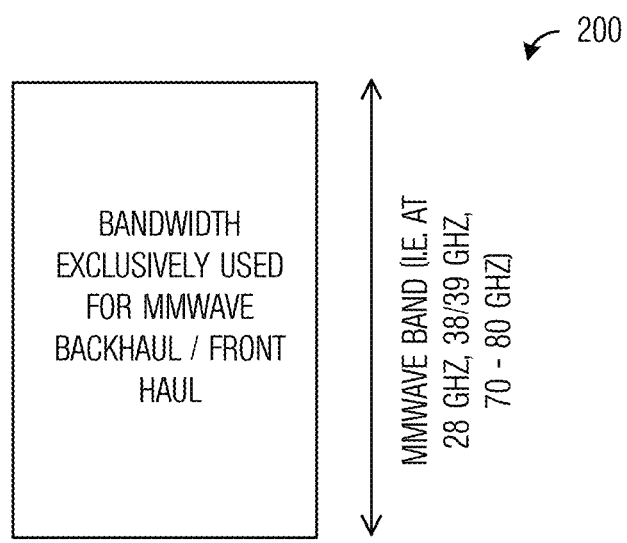
FIG. 2A illustrates a bandwidth allocation diagram of a frequency band used for backhaul links when access links use a different frequency band according to example embodiments described herein.

FIG. 2A illustrates a bandwidth allocation diagram 200 of a frequency band used for backhaul links when access links use a different frequency band. As shown in FIG. 2A, the entirety of the frequency band used for the backhaul links is usable by the backhaul links because the access links uses a different frequency band. This particular configuration is typically used in some configurations of 3GPP LTE Advanced (LTE-A) for links between eNBs, MeNBs, SeNBs, RRHs, and so on. It is noted that although the discussion focuses on backhaul links, the example embodiments presented herein are also operable with fronthaul links. Therefore, the focus on backhaul links should not be construed as being limiting to either the scope or spirit of the example embodiments.

Figure 2B:
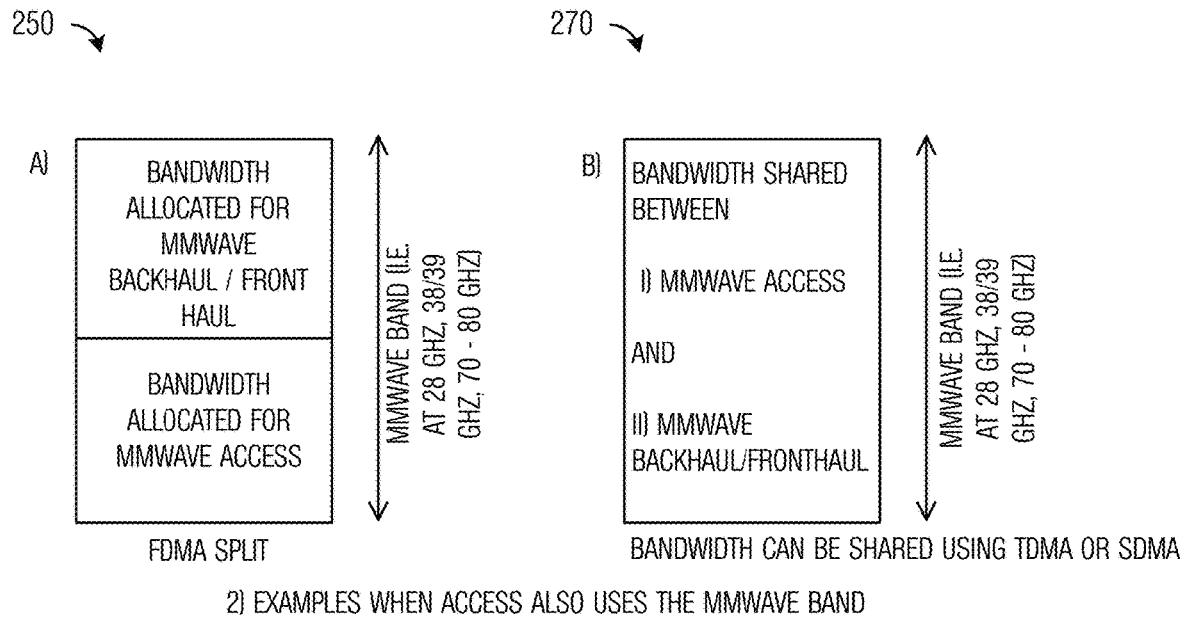
FIG. 2B illustrates bandwidth allocation diagrams of a frequency band used for backhaul links when access links use the same frequency band as the backhaul links according to example embodiments described herein.

FIG. 2B illustrates bandwidth allocation diagrams of a frequency band used for backhaul links when access links use the same frequency band as the backhaul links. The same spectral resources may be multiplexed for an integrated access and backhaul (IAB) deployment when backhaul and access are multiplexed using frequency division multiplexing (FDM), time division multiplexing (TDM), and/or spatial division multiplexing (SDM). A first bandwidth allocation diagram 250 illustrates a situation wherein the high frequency band is shared between the backhaul link and access using frequency division multiple access (FDMA) and is partitioned into at least two portions, with a first high frequency portion is allocated to the backhaul link and a second high frequency portion allocated to the access. A second bandwidth allocation diagram 270 illustrates a situation wherein the frequency band is shared using time division multiple access (TDMA) or spatial division multiple access (SDMA). If TDMA is used, the backhaul link is assigned to use the high frequency band at specific times and the access is assigned to use the high frequency band at other specific times. If SDMA is used, the high frequency backhaul link is assigned to use the frequency band only in specific spatial orientations (or beam directions) and the access is assigned to use the same frequency band in other specific spatial orientations (or beam directions), where the spatial orientations may change as a function of time.

In contrast to TDM, SDM may be used in an IAB deployment to allow access links and backhaul links to share the same spectral resources simultaneously. The spectral efficiency of SDM may potentially be higher than that of TDM. However, the potential interference caused by spatial multiplexing the access links and the backhaul links may need to be carefully managed to realize the potential gains promised by SDM over TDM.

In a beamformed environment, the transmission and/or reception of beamformed backhaul links from one TRP to its neighboring TRPs may need to be coordinated, thereby requiring the consideration of a variety of interference issues.

Figure 3:
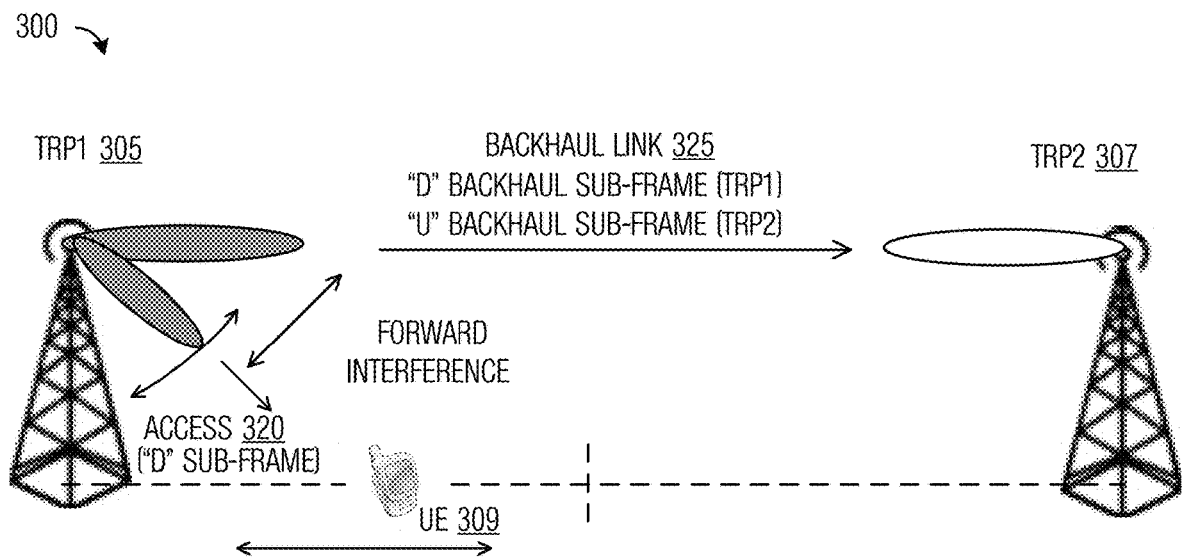
FIG. 3 illustrates a communications system highlighting forward interference according to example embodiments described herein.

FIG. 3 illustrates a communications system 300 highlighting forward interference. Forward interference may be viewed as interference in the same direction. Communications system 300 includes a first TRP (TRP1) 305, a second TRP (TRP2) 307, and a UE 309. TRP1 305 has an access link 320 with UE 309. TRP1 305 has a backhaul link 325 with TRP2 307. Forward interference may occur when TRP1 305 is transmitting on backhaul link 325 to TRP2 307 at the same time when it is transmitting on access link 320 to UE 309. The transmission on backhaul link 325 to TRP2 307 may appear on access link 320 and received by UE 309.

In general, the amount of forward interference may depend upon factors such as:
- The beamforming (or precoding) used for the backhaul link;
- The beamforming (or precoding) used for the access link; and
- The angle (in the vertical and/or horizontal planes) between the access link and the backhaul link. It is noted that the angle between the access link and the backhaul link may be different for different scheduled UEs.

Solutions for dealing with forward interference may be similar to techniques related to multi-user (MU) multiple input multiple output (MU-MIMO). In a first solution, if there is a large pool of UEs to select from to perform co-scheduling with the backhaul link, the problem of forward interference may be solved using scheduling algorithms, which may take into account the radiation pattern of the beamformed backhaul links (which are generally fixed) into consideration to make the co-scheduling considerations. As an example, the radiation pattern (or information related to the radiation pattern) of the beamformed backhaul links may be stored in a lookup table, such as a two-dimensional lookup table. In a second solution, if the number of UEs to select from is low, and the UEs have small angular distance to the backhaul links, advanced linear or non-linear precoding algorithms may be used to reduce the effects of forward interference.

Figure 4A:
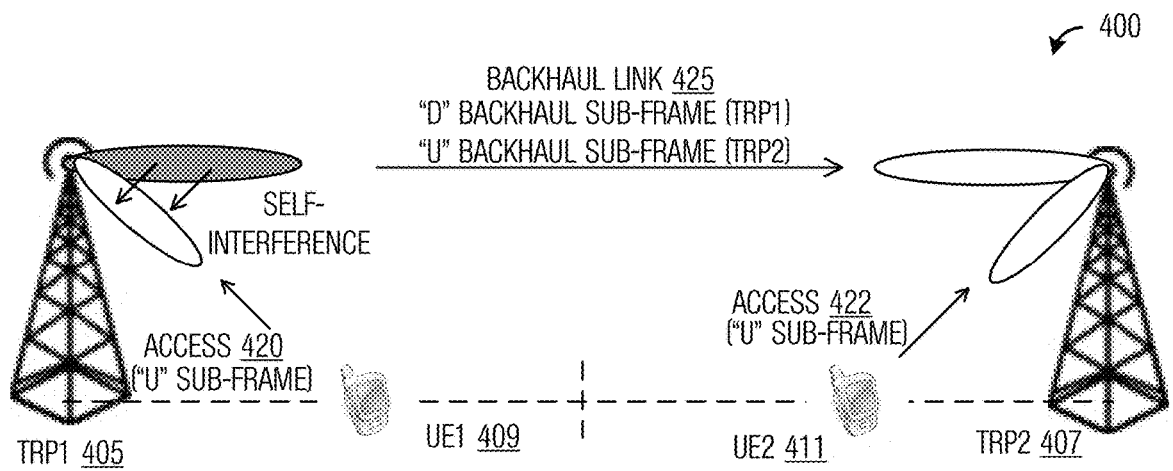
FIG. 4A illustrates a communications system highlighting a first form of self-interference according to example embodiments described herein.

FIG. 4A illustrates a communications system 400 highlighting a first form of self-interference. Self-interference may also be referred to as cross interference. Communications system 400 includes a first TRP (TRP1) 405, a second TRP (TRP2) 407, a first UE (UE1) 409, and a second UE (UE2) 411. TRP1 405 has an access link 420 with UE1 409, while TRP2 407 has an access link 422 with UE2 411. TRP1 405 has a backhaul link 425 with TRP2 407. When TRP1 405 is receiving in access link 420 from UE1 409 (e.g., during an uplink access subframe) while transmitting in backhaul link 425 to TRP2 407 (e.g., during a downlink backhaul subframe), self-interference may occur due to the high transmission power of the TRP1 405 to TRP2 407 backhaul transmission leaking into an uplink receiver of TRP1 405 that is receiving an uplink transmission on access link 420 between TRP1 405 and UE1 409. This form of cross-interference may not depend upon the location of UE 409 and is similar to self-interference in a full-duplex receiver.

Figure 4B:
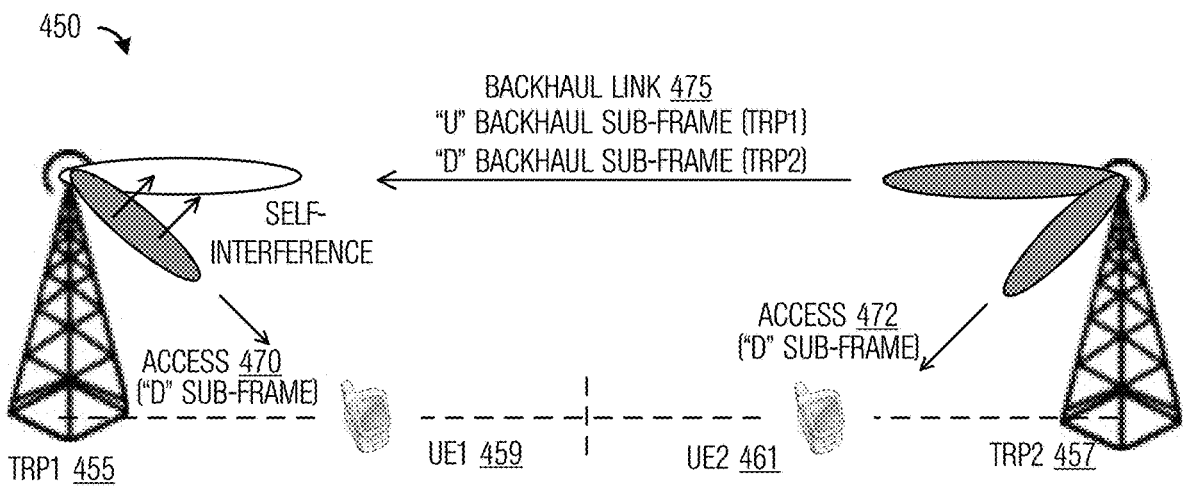
FIG. 4B illustrates a communications system highlighting a second form of self-interference according to example embodiments described herein.

FIG. 4B illustrates a communications system 450 highlighting a second form of self-interference. Communications system 450 includes a first TRP (TRP1) 455, a second TRP (TRP2) 457, a first UE (UE1) 459, and a second UE (UE2) 461. TRP1 455 has an access link 470 with UE1 459, while TRP2 457 has an access link 472 with UE2 461. TRP1 455 has a backhaul link 475 with TRP2 457. When TRP1 455 is receiving in backhaul link 475 from TRP2 457 (e.g., during an uplink backhaul subframe) and transmitting in access link 470 to UE1 459 (e.g., during a downlink access subframe), self-interference may occur as the downlink access link transmission to UE1 459 self interferes into an uplink receiver of TRP1 455 that is receiving an uplink transmission on backhaul link 475 between TRP1 455 and TRP2 457.

Coping with self-interference may require a special TRP type that is capable of performing wideband (up to several gigahertz or more of bandwidth) self-interference cancellation (SIC), which would allow the TRP to operate in full duplex mode. It is noted that not all types of TRPs are capable of full duplex operations. The ability to operate in full duplex mode is a TRP capability. Hence, it is possible for the TRPs associated with a particular backhaul link to have different TRP capability.

According to an example embodiment, the configuration of the backhaul link communications is based upon the TRP capability of the TRPs which are associated with the backhaul link. In particular the TRP capability of TRPs to handle and receive signals at the same time, i.e., full duplex capability. As an example, in a backhaul link involving two TRPs, different configurations of the backhaul link exist for situations when both TRPs are full duplex capable, one TRP is not full duplex capable, or neither TRP are full duplex capable. A different configuration of the backhaul link communications may be specified for each of the three different situations.

According to an example embodiment, in a situation where both TRPs are full duplex capable, the configuration of the backhaul link communications allows the two TRPs to transmit and/or receive at any time because the two TRPs are full duplex capable.

According to an example embodiment, in a situation when one or both of the TRPs are not full duplex capable, the configuration of the backhaul link communications is restricted in accordance with the subframe configurations for the access link involving the TRPs.

Figure 5:
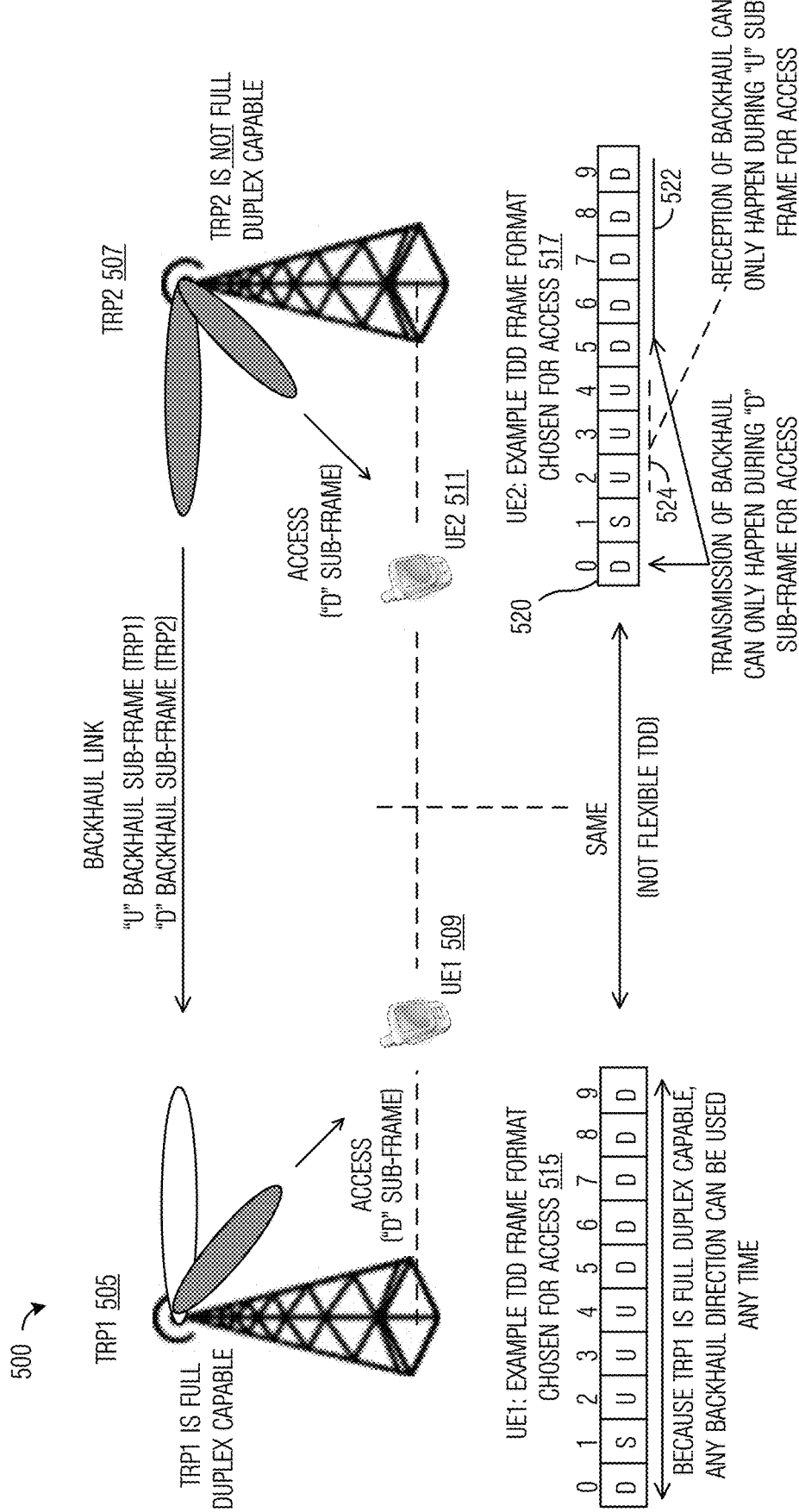
FIG. 5 illustrates a communications system highlighting an example configuration of the backhaul link communications when one of the two TRPs is not full duplex capable according to example embodiments described herein.

FIG. 5 illustrates a communications system 500 highlighting an example configuration of the backhaul link communications when one of the two TRPs is not full duplex capable. Communications system 500 includes a first TRP (TRP1) 505, a second TRP (TRP1) 507, a first UE (UE1) 509, and a second UE (UE2) 511. TRP1 505 is full duplex capable while TRP2 507 is not full duplex capable. UE1 509 uses TDD frame format 515 for access with TRP1 505, while UE2 511 uses TDD frame format 517 for access with TRP2 507. As shown in FIG. 5, the two TDD frame formats are identical. However, it is not required that the TDD frame formats be the same. Frame formats, such as TDD frame formats 515 and 517, specify transmission allocations of subframes of radio frames. Therefore, a single frame format corresponds to a plurality of subframe formats. As an example, in 3GPP LTE compliant communications systems, a subframe may be allocated for downlink transmissions, uplink transmissions, or special. Other communications systems may have different transmission allocations of subframes. The transmission allocation for a single subframe is referred to as a subframe format. Although the discussion presented herein focuses on frame formats, subframe formats may be used in its place without loss of generality.

Because TRP1 505 is full duplex capable, TRP1 505 may perform backhaul communications at any time; TRP1 505 may use SIC to cancel interference or the transmitter and receiver may have sufficient separation or isolation to handle the self-interference, for example. However, TRP2 507 is not full duplex capable, so TRP2 507 can only perform backhaul communications at certain times. In order to prevent self-interference, TRP2 507 makes a backhaul transmission to TRP1 505 only during TDD subframes that are allocated as downlink subframes, such as subframes 520 and 522, and makes a backhaul reception from TRP1 505 only during TDD subframes that are allocated as uplink subframes, such as subframes 524. FIG. 5 illustrates a TRP arrangement for subframes 520 or 522. Although the number of subframes available for backhaul communications is limited, the restriction may still be manageable due to the high data rates (i.e., a high modulation and coding scheme (MCS) level, e.g., 256 quadrature amplitude modulation (QAM), is used) supported in the backhaul.

However, depending upon the MCS used for the backhaul link and the total amount of backhaul data being transmitted for the TRPs (e.g., number of TRPs*data rate per TRP), the communications system (e.g., an entity in the communications system) may elect to restrict the use of TDD frame formats for access. As an example, frame formats that contain dominant number of uplink subframes may be selected to allow sufficient capacity for the backhaul link in both directions of the backhaul link.

FIG. 6 illustrates a table 600 of example TDD frame formats. Table 600 presents seven example frame formats with differing periodicities. Each frame includes 10 subframes, with each subframe possibly being allocated for downlink transmissions (denoted "D"), uplink transmissions (denoted "U"), or special (denoted "S"). In other words, each subframe has a subframe format of D, U, or S. Subframes (in order from subframe 0 to subframe 9) of frame 605 are allocated for downlink, special, uplink, uplink, uplink, downlink, special, uplink, uplink, and uplink. Subframes of frame 607 are allocated for downlink, special, uplink, downlink, downlink, downlink, downlink, downlink, downlink, and downlink, while subframes of frame 609 are allocated for downlink, special, uplink, uplink, uplink, downlink, special, uplink, uplink, and downlink.

As discussed previously, in order to support backhaul communications, frame formats that include a dominant number of uplink subframes may be selected. Hence, frames 605 and 607 may be restricted, while frames with dominant number of uplink subframes, such as frame 609, may be selected.

According to an example embodiment, in a situation when both of the TRPs are not full duplex capable, a backhaul transmission from a first TRP to a second TRP takes place during a time interval associated with a subframe (of a first UE served by the first TRP) that is allocated for downlink transmissions and a subframe (of a second UE served by the second TRP) that is allocated for uplink transmissions. This different subframe allocation for the two subframes associated with the same time interval is referred to as a conflict subframe. The use of the time interval associated with the conflict subframe for access prevents self-interference at receiving TRPs that are non-full duplex capable.

When neither of the TRPs involved in communications over a backhaul link are full duplex capable, backhaul communications may still be possible but may be limited to situations where conflict subframes exist in the TDD frame formats for access of the TRPs. In a similar manner, flexible TDD may be operable in such a scenario. If backhaul communications is needed in both directions within a single frame, a TDD frame format with at least one conflict subframe is required for each of the two directions of the backhaul communications.

Figure 7A:
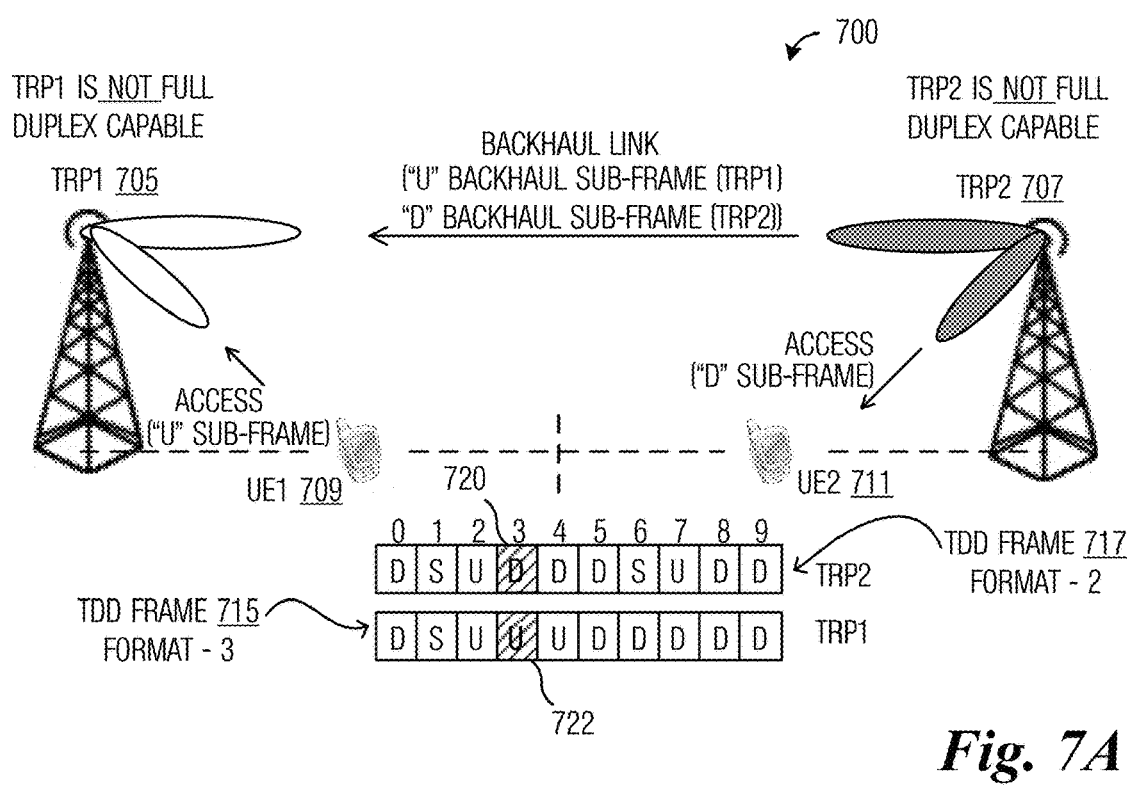
FIG. 7A illustrates a communications system highlighting a first example configuration of backhaul link communications with neither of the two TRPs are full duplex capable according to example embodiments described herein.

FIG. 7A illustrates a communications system 700 highlighting a first example configuration of backhaul link communications with neither of the two TRPs are full duplex capable. Communications system 700 includes a first TRP (TRP1) 705, a second TRP (TRP1) 707, a first UE (UE1) 709, and a second UE (UE2) 711. TRP1 705 and TRP2 707 are not full duplex capable. TRP1 705 uses TDD frame format 715 for access with UE1 709, while TRP2 707 uses TDD frame format 717 for access with UE2 711. It is noted that the two TDD frame formats are different.

Because neither TRPs are full duplex capable, in-band backhaul can only be achieved under certain conditions. In order to prevent self-interference TRP2 707 may only make a backhaul transmission to TRP1 705 during access subframes which are allocated for downlink transmissions (i.e., subframes allocated for access transmissions from TRP2 707 to UE2 711). In addition to the restriction on the access subframe for TRP2 707, TRP2 707 may also only make a backhaul transmission to the receiving TRP1 705 during an access subframe allocated for uplink reception at TRP1 705 (i.e., subframes allocated for access transmissions from UE1 709 to TRP1 705 (subframes that are allocated for uplink transmissions from the UEs served by TRP1 705)) in order to meet the non-full duplex capability of TRP1 705. In other words, the backhaul transmissions between a first TRP to a second TRP only take place during time intervals associated with conflict subframes, with the access subframe of a UE served by the first TRP (the transmitting TRP) being allocated as a downlink access subframe. As an example, subframe 720 of TDD frame format 717 and subframe 722 of TDD frame format 715 are conflict subframes and allocated accordingly to meet the non-full duplex capabilities of the TRPs.

Figure 7B:
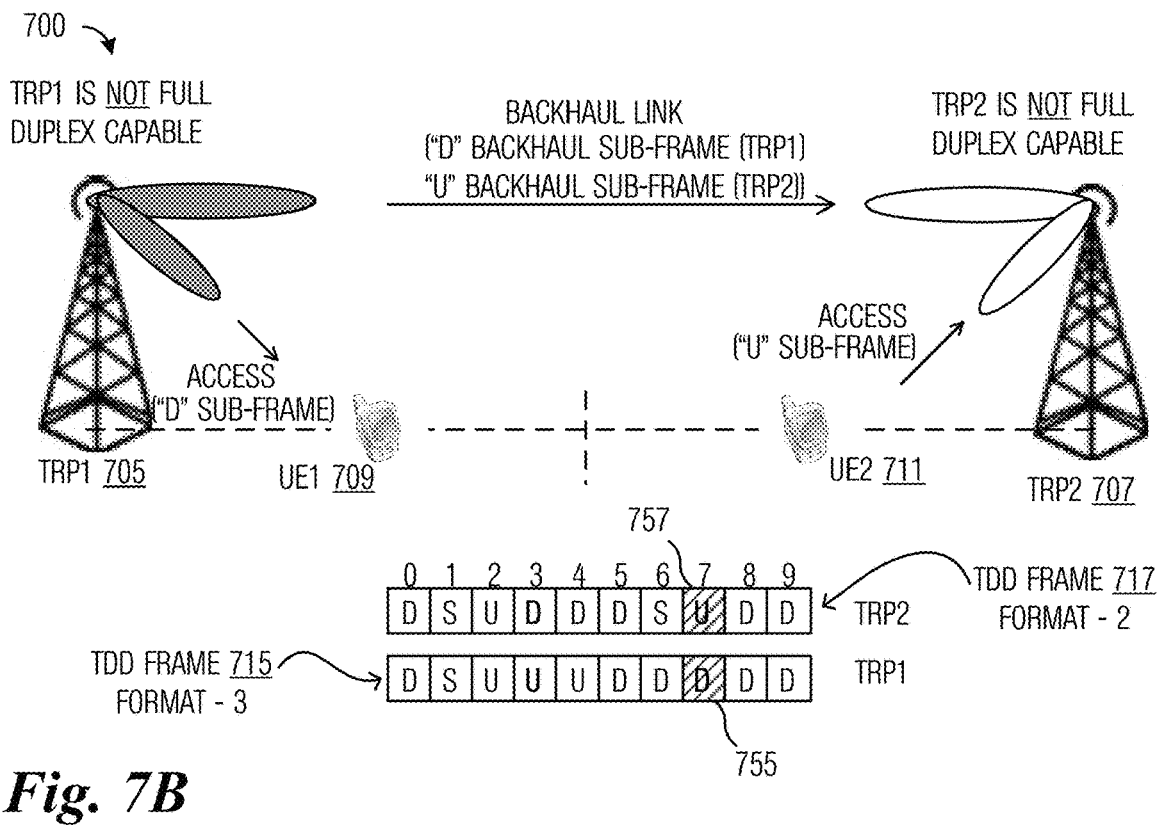
FIG. 7B illustrates the communications system of FIG. 7A highlighting a second example configuration of backhaul link communications with neither of the two TRPs are full duplex capable according to example embodiments described herein.

FIG. 7B illustrates communications system 700 highlighting a second example configuration of backhaul link communications with neither of the two TRPs are full duplex capable. As shown in FIG. 7B, TRP1 705 has a backhaul transmission for TRP2 707. In order to prevent self-interference, TRP1 705 may only make the backhaul transmission to TRP2 707 during access subframes which are allocated for downlink transmission (i.e., subframes allocated for access transmissions from TRP1 705 to UE1 709). In addition to the restriction on the access subframe for TRP1 705, TRP1 705 may also only make a backhaul transmission to the receiving TRP2 707 during an access subframe allocated for uplink reception at TRP2 707 (i.e., subframes allocated for access transmissions from UE2 711 to TRP2 707 (subframes that are allocated for uplink transmissions from UEs served by TRP2 707)) in order to meet the non-full duplex capability of TRP2 707. As an example, subframe 755 of TDD frame format 715 and subframe 757 of TDD frame format 717 are conflict subframes and allocated accordingly to meet the non-full duplex capabilities of the TRPs.

Figure 7C:
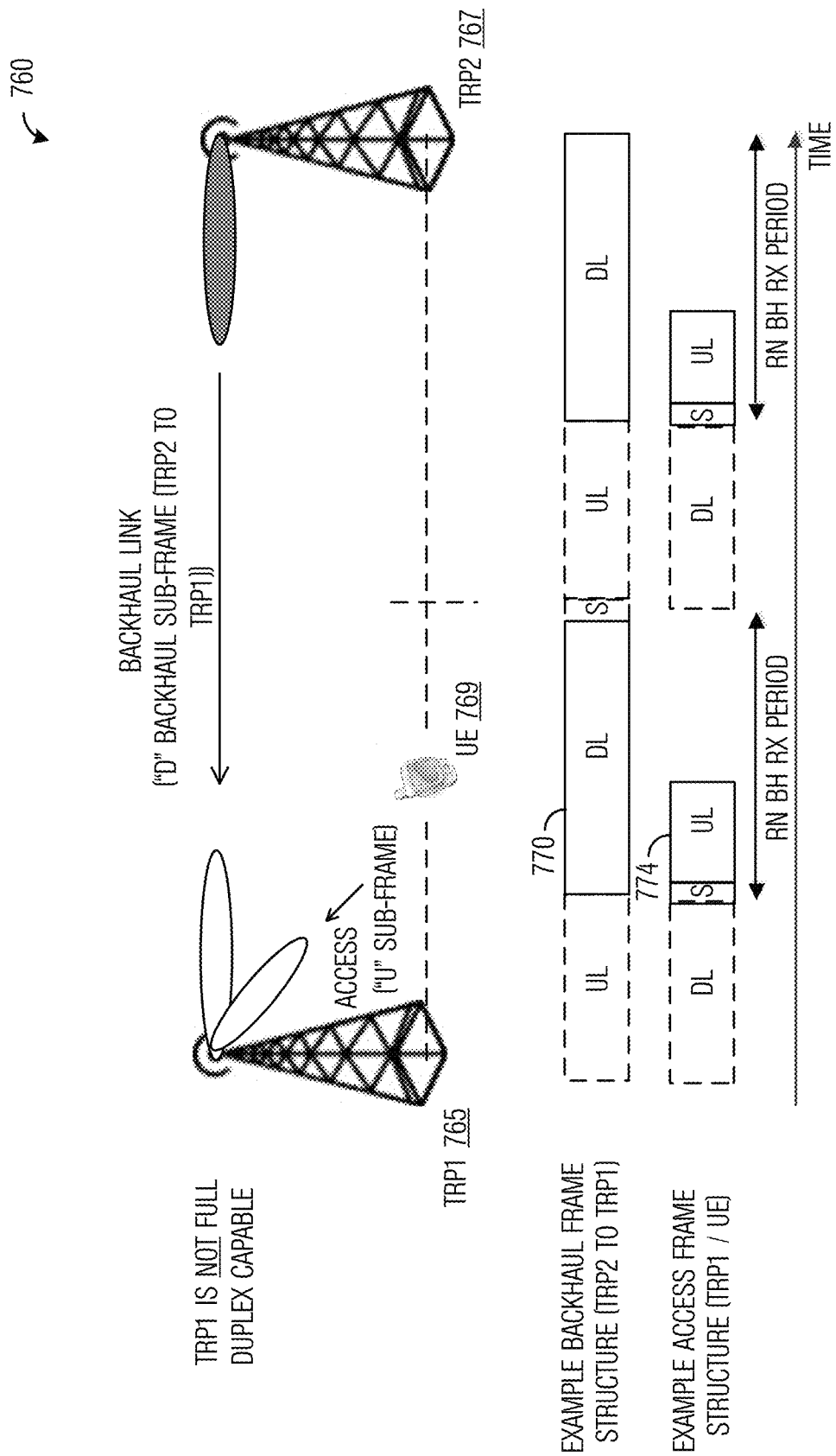
FIG. 7C illustrates a communications system highlighting a third example configuration of backhaul link communications with neither of the two TRPs are full duplex capable according to example embodiments described herein.

FIG. 7C illustrates a communications system 760 highlighting a third example configuration of backhaul link communications with neither of the two TRPs are full duplex capable. Communications system 760 includes a first TRP (TRP1) 765, a second TRP (TRP2) 767, and a UE 769. TRP1 765 and TRP2 767 are not full duplex capable. The TRPs utilize TDD frame formats that are not constrained to a fixed set of formats. In other words, the TRPs may use a self-constrained new sub-frame type, such as those presented below. In such a situation, it is possible to have a transmission gap in the backhaul and/or access subframes. The transmission gap may be used to accommodate the half-duplex requirements of the communications system. As shown in FIG. 7C, TRP1 765 is receiving downlink backhaul communications from TRP2 767 (such as in interval 770) at the same time as it is receiving uplink access communications from UEs (e.g., UE 769) in its coverage area (such as in interval 774). In this situation, portions of the frame are blanked out because TRP1 765 does not have a sufficient number of UEs to schedule for uplink communications. It is noted that the intervals (such as interval 770 and interval 774) comprises one or more subframes.

Figure 7D:
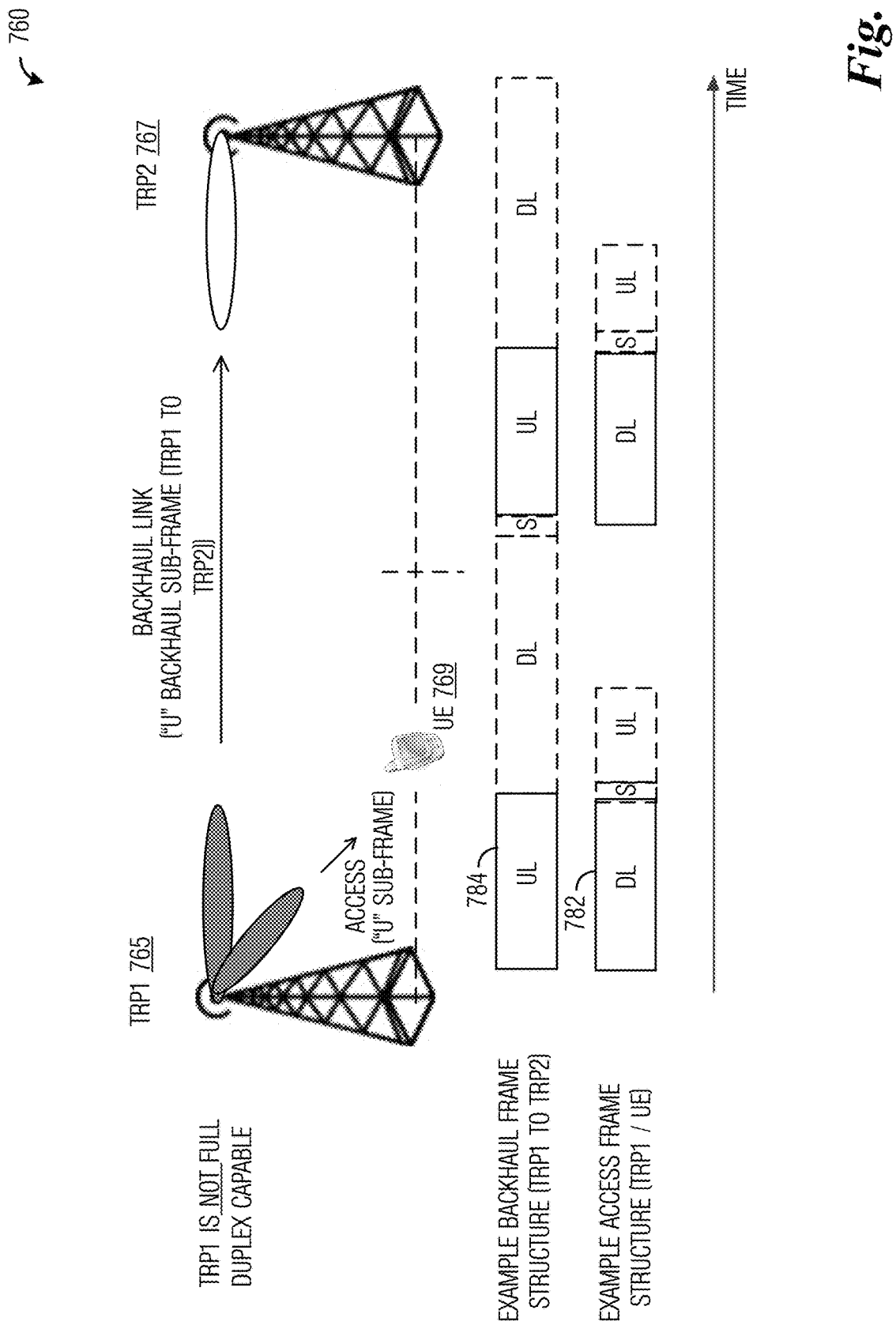
FIG. 7D illustrates a communications system highlighting a fourth example configuration of backhaul link communications with neither of the two TRPs are full duplex capable according to example embodiments described herein.

FIG. 7D illustrates a communications system 760 highlighting a fourth example configuration of backhaul link communications with neither of the two TRPs are full duplex capable. FIG. 7D presents a reverse case of the situation shown in FIG. 7D, with TRP1 765 performing downlink access communications with UEs (e.g., UE 769) in its coverage area (such as in interval 782) and uplink backhaul communications with TRP2 767 (such as in interval 784). In this situation, because the amount of data for the uplink backhaul data and the downlink access data are similar, no blanking is required. It is noted that the intervals (such as interval 782 and interval 784) comprises one or more subframes.

Although the TDD frame formats shown in FIGS. 7A and 7B support backhaul communications in situations where neither TRP is full duplex capable, however, cross interference across cell boundaries (UE to UE interference) still persists. In beamformed communications, several solutions are available to mitigate the interference across cell boundaries. In order to enable sufficient capacity for SDMA backhaul communications in such situations, TDD frames for access may be selected to have a sufficient number of subframes that are in different directions. This may restrict the choice of TDD access frames for neighboring TRPs. The extent of the restrictions may be dependent upon the amount of backhaul data needed and the data rates that can be supported (i.e., MCS level) used for the backhaul link.

FIG. 8A illustrates a table 800 of example TDD frame formats, highlighting a first TDD frame selection. The frame formats shown in table 800 are for 3GPP LTE-A, however frame formats for other communications systems may be different. As shown in FIG. 8A, if a first TRP uses TDD frame format 805 and a second TRP uses TDD frame format 807, there are two conflict subframes (shown as shaded subframes) with the subframe allocations for each of the two the conflict subframes changing between the conflict subframes.

FIG. 8B illustrates a table 850 of example TDD frame formats, highlighting a second TDD frame selection. As shown in FIG. 8B, if a first TRP uses TDD frame format 855 and a second TRP uses TDD frame format 857, there are five conflict subframes (shown as shaded subframes). However, the conflict subframes are all in the same direction. With the TDD frame formats, as selected, only the first TRP will be able to make transmissions on the backhaul link during the TDD frame.

In a future Fifth Generation (5G) (and later) communications system, there may be more than two different types of subframe allocations (or subframe types), such as:

Downlink (denoted "D");
Uplink (denoted "U");
Self-constrained new subframe type "D" for data (contains "U" and "D" for control); and
Self-constrained new subframe type "U" for data (contains "U" and "D" for control).

It is not yet known in 5G communications systems if uplink and/or downlink TDD frame formats will be constrained to a finite set of formats (e.g., such as the seven frame configurations for 3GPP LTE-A) with possibly a larger number of different formats or if each subframe format or type in the frame will be totally flexibly defined. Whatever way the TDD frame for access is designed in 5G and later communications systems, SDMA backhaul communications will be possible when the subframes of neighboring TRPs are conflict subframes (i.e., subframes are in different directions).

The discussion presented previously has focused on same sector interference. In order to support different sector interference, additional interference mitigation may be provided. In a co-assigned US Provisional Patent Application entitled "System and Method for Time Division Duplexed Multiplexing in Transmission-reception Point to Transmission-Reception Point Connectivity", Application No. 62/341,877, Filed May 26, 2016, and US Patent Application entitled "System and Method for Time Division Duplexed Multiplexing in Transmission-reception Point to Transmission-Reception Point Connectivity", application Ser. No. 15/289,926, Filed Oct. 10, 2106, which are hereby incorporated herein by reference, techniques for different sector backhaul communications between TRPs are presented.

Figure 9A:
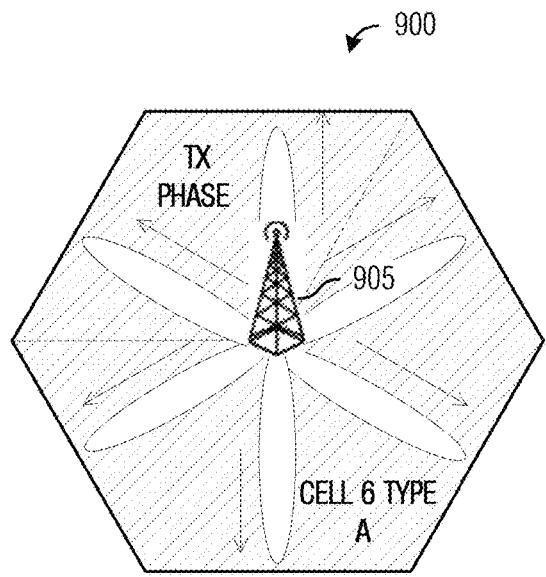
FIGS. 9A-9C illustrate different communications phases of a TRP to TRP communications link to help mitigate different sector interference in an IAB implementation according to example embodiments described herein.
Figure 9B:
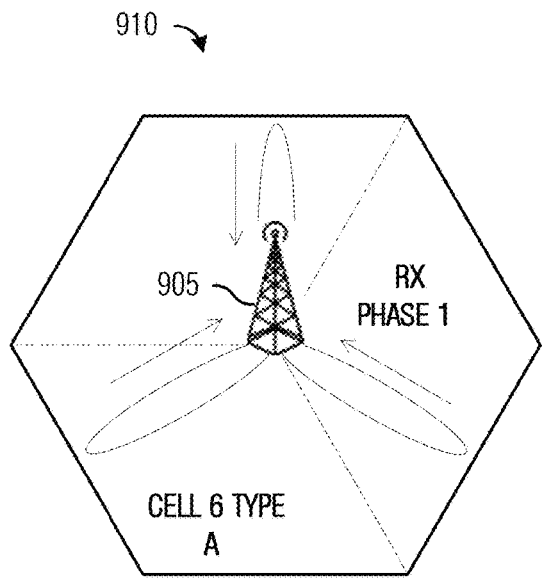
Figure 9C:
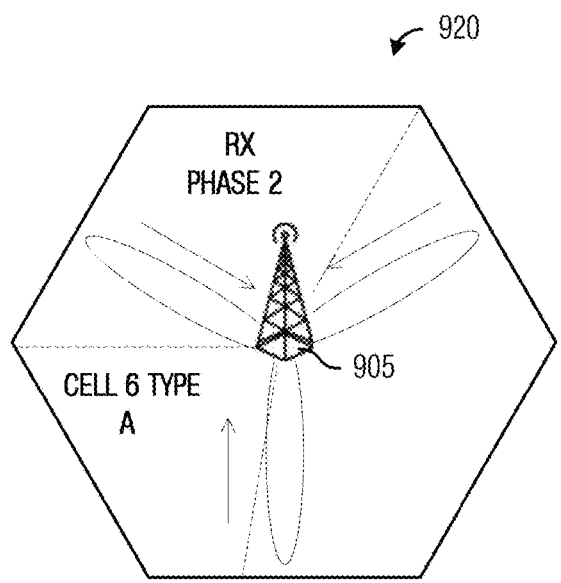

FIGS. 9A-9C illustrate different communications phases of a TRP to TRP communications link to help mitigate different sector interference in an IAB implementation. FIG. 9A illustrates a transmit phase 900. In transmit phase 900, TRP 905 transmits using all available transmit beams. The transmission using all available transmit beams ensure that all sectors of TRP 905 are covered for backhaul and access links (although only the backhaul communications (backhaul transmissions) to neighboring TRPs are shown). FIG. 9B illustrates a first receive phase 910. In first receive phase 910, TRP 905 receives using a first subset of available receive beams. As an illustrative example, the first subset of available receive beams includes approximately one-half of the receive beams of TRP 905, with the distribution of the receive beams arranged so that the receive beams of the first subset is about evenly distributed. FIG. 9C illustrates a second receive phase 920. In second receive phase 920, TRP 905 receives using a second subset of available receive beams. As an illustrative example, the second subset of available receive beams includes the remaining receive beams of TRP 905, with the distribution of the receive beams arranged so that the receive beams of the second subset is about evenly distributed. Hence, the combination of first receive phase 910 and second receive phase 920 ensures that all sectors of TRP 905 are covered for the receiving of backhaul and access links.

It is noted that although FIGS. 9A-9C present the situation with a single transmit phase and two receive phases, other combinations of transmit and receive phases are possible. As an illustrative example, an alternate situation may include a single receive phase and two transmit phases. Another alternate situation may include a single transmit phase and three (or more) receive phases, or a single receive phase and three (or more) transmit phases. In yet another alternate situation, there may be two (or more) transmit phases and two (or more) receive phases.

Figure 10:
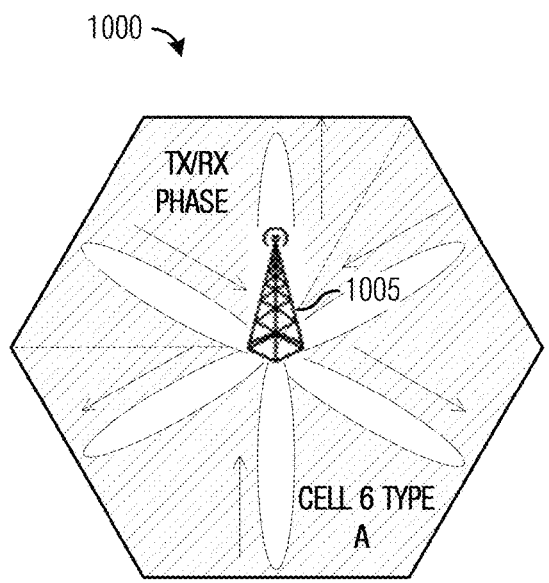
FIG. 10 illustrates a communications phase diagram for a TRP to TRP communications link whereby the TRP is capable of simultaneously receiving and/or transmitting on different sectors according to example embodiments described herein.

FIG. 10 illustrates a communications phase diagram 1000 for a TRP to TRP communications link wherein the TRP is capable of simultaneously receiving and/or transmitting on different sectors. If the TRP, e.g., TRP 1005, is capable of simultaneously receiving and/or transmitting on different sectors, much greater flexibility is possible. In such a situation, the TRP may be able to simultaneously receive and/or transmit on backhaul and access links in a single phase, as shown in FIG. 10.

FIG. 11 illustrates a table 1100 summarizing different IAB configuration restrictions in accordance with TRP capabilities. Table 1100 summarizes restrictions on IAB configurations for backhaul links and TDD frames for access links in accordance with the SDM and TRP capability (e.g., full duplex capable or non-full duplex capable) of one or more of the TRPs associated with a backhaul link. As an example, row 1105 corresponds to a situation where both TRPs of a backhaul link are full duplex capable within the same sector and across different sectors. In such a situation, there are no restrictions on the backhaul configuration. Row 1110 corresponds to a situation where one of the TRPs of a backhaul link is non-full duplex capable with the same sector, but is full duplex capable across different sectors. In such a situation, IAB operation is limited by the TDD access frame of the non-full duplex capable TRP.

Row 1115 corresponds to a situation where one of the TRPs of a backhaul link is non-full duplex capable in the same sector and one of the TRPs is also non-full duplex capable across different sectors. In such a situation, IAB operation is limited by the TDD access frame of the non-full duplex capable TRP. Additionally, the particular TRP can only simultaneously transmit and/or receive from all neighbor TRPs (as an example, consider the configuration shown and discussed in FIGS. 9A-9C). Row 1120 corresponds to a situation where both TRPs are non-full duplex capable with the same sector (in such a situation, it does not matter the TRP capability across different sectors). In such a situation, IAB operation is limited to conflict subframes of the TRPs involved (such as shown in FIGS. 7A and 7B). Additional restrictions may be imposed if some TRPs are not full duplex capable across different sectors.

According to an example embodiment, TRP capabilities are signaled to other network entities (such as eNBs, gNBs, adjacent TRPs, etc.) using an interface, including an X2 interface or some other future generation X2 like interface, to enable the selection of backhaul and access link configurations. The TRP capabilities may be used in a system and method for supporting backhaul and access operation in beamformed communications systems to accommodate TRPs with differing capabilities.

As an illustrative example, TRP capability, in the form of an IAB capability word, is signaled. An example IAB capability word is as follows:

Bit 1—SDM capable ('0'—no, '1'—yes);
Bit 2—FDM capable ('0'—no, '1'—yes);
Bit 3—FDM capable ('0'—no, '1'—yes);

additional bits may be used to indicate other capabilities, such as CDM, and so on. Each TRP may have its own IAB capability word.

In a situation where a TRP is able to support multiple IAB configurations (e.g., multiple '1' values in its IAB capability word), a selected IAB configuration may utilize a combination of multiple schemes simultaneously.

In addition to the actual multiplexing backhaul capability configuration that each TRP is capable of supporting (SDM, TDM, FDM, and so on), the network may also need to know how each TRP can handle transmitting and receiving (or vice versa) on access links and backhaul links simultaneously in the same sector or across different sectors. Such ability is of importance to TDM and SDM based methods. The TRP's capability to communicate on access and backhaul links in the same sector or across different sectors may be referred to as the TRP's self-interference capability, which may be presented in the form of a multi-valued indicator. An example multi-valued indicator indicating a TRP's self-interference capability includes:

'00'—TRP is not capable of transmitting and/or receiving signals at the same time or frequency;

'01'—TRP is only capable of transmitting and/or receiving signals at the same time or frequency across different sectors or array panels (additional values may be used to indicate an exact sector offset(s) supported);

'10'—TRP is capable of transmitting and/or receiving signals at the same time or frequency, irrespective of sector (both in same sector or across different sectors); and '11'—TRP is only capable of transmitting and/or receiving signals at the same time or frequency in same sector or array panel.

In addition to the TRP capability and the TRP self-interference capability, a TRP may also indicate a preference for a particular TDD frame format for access links. A TRP's preference for a particular TDD frame format may be indicated by using a multi-valued frame format indicator, the length of which is dependent upon the number of possible TDD frame formats. As an illustrative example, 3GPP LTE has seven TDD frame formats; therefore, indicating a preference of one of the seven 3GPP LTE TDD frame formats would require at least a three bit long frame format indicator.

Figure 12A:
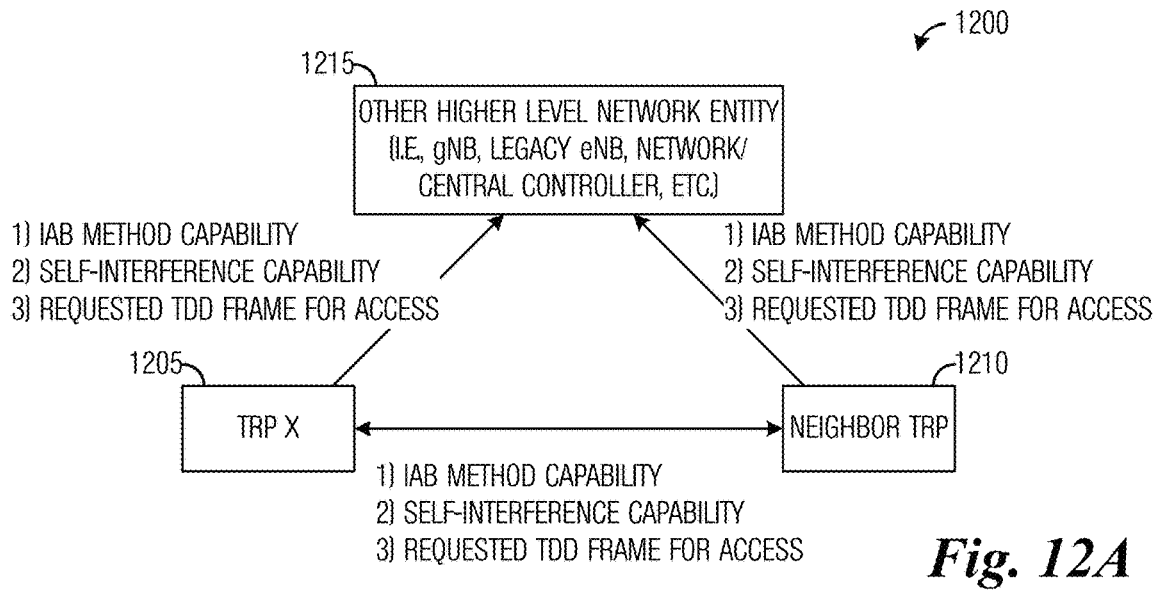
FIG. 12A illustrates a communications system highlighting a first example TRP capabilities and requested access frame format reporting configuration according to example embodiments described herein.

FIG. 12A illustrates a communications system 1200 highlighting a first example TRP capabilities and requested access frame format reporting configuration. Communications system 1200 includes a TRP (TRP X) 1205, a neighboring TRP 1210, and a higher level network entity 1215. Higher level network entity 1215 may be a dedicated stand-alone backhaul and access link configuration determination entity. Alternatively, higher level network entity 1215 may be co-located with another network entity, such as a gNB, eNB, central controller, and so on.

According to the first example TRP capabilities and requested access frame format reporting configuration, each TRP reports its own IAB capability, TRP self-interference capability, and requested access frame format indicator to higher level network entity 1215. As shown in FIG. 12A, TRP X 1205 and neighboring TRP 1210 separately report their IAB capability, TRP self-interference capability, and requested access frame format indicator to higher level network entity 1215. The TRPs may also share the TRP capabilities (IAB and self-interference) and requested access frame format amongst themselves.

The reporting of the IAB capability, TRP self-interference capability, and requested frame format indicator may occur statically, semi-statically, or dynamically. The reporting may take place over an X2 interface or some other next generation X2 interface which may be wired or wireless. Depending upon how a particular TRP is connected, different TRPs may use different interfaces to report the TRP capabilities. The different TRPs may also report the various TRP capabilities at the same rate or at different rates. As an example, the requested access frame structure indicator may be reported dynamically or at a higher rate than the IAB capability.

Figure 12B:
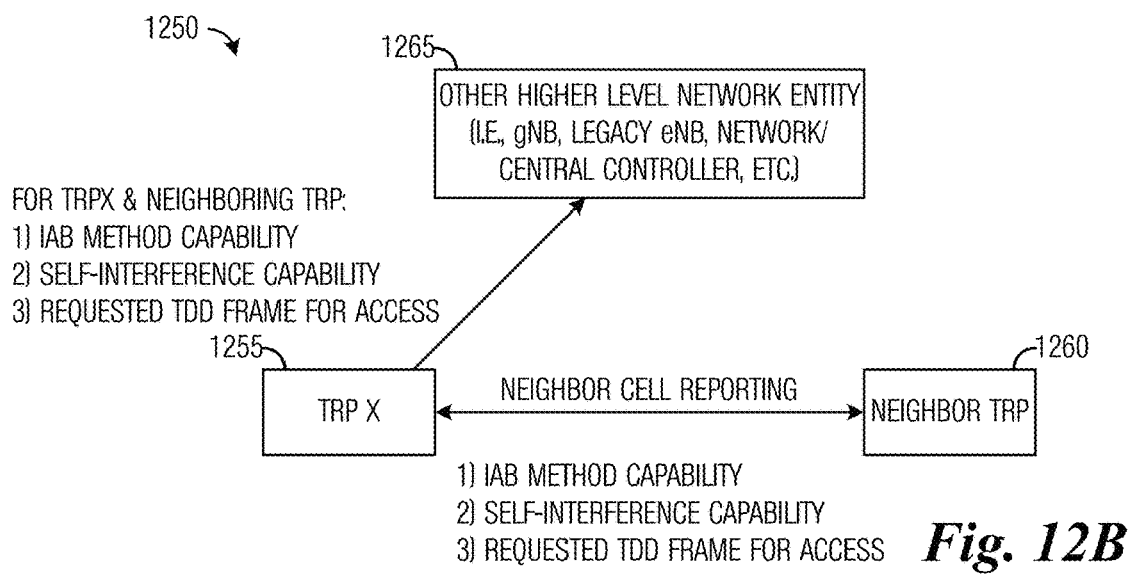
FIG. 12B illustrates a communications system highlighting a second example TRP capabilities and requested access frame format reporting configuration according to example embodiments described herein.

FIG. 12B illustrates a communications system 1250 highlighting a second example TRP capabilities and requested access frame format reporting configuration. Communications system 1250 includes a TRP (TRP X) 1255, a neighboring TRP 1260, and a higher level network entity 1265. According to the second example TRP capabilities and requested access frame format reporting configuration, one or more neighboring TRPs (e.g., neighbor TRP 1260) report their respective TRP capabilities and requested access frame structure to a particular TRP (e.g., TRPX 1255) and the particular TRP reports the TRP capabilities and requested access frame format of the one or more neighboring TRPs, along with its own TRP capabilities and requested access frame format, to higher level network entity 1265.

An example situation wherein the second example TRP capabilities and requested access frame format reporting configuration may be used involves a temporary TRPs (e.g., TRPs deployed for special events, such as concerts, conventions, sports events, and so on), mobile TRPs (e.g., TRPs located on buses, trains, cars, any airborne vessel (i.e. balloon, plane, drones, etc.), or any water vessel (boats, ships, ferries, etc.) and so forth), or dynamic TRPs (e.g., TRPs that turn on and off at specific times, events, etc.) are used. These temporary TRPs can report their TRP capabilities and requested access frame format to more stable (e.g., permanently deployed) TRPs in their neighborhood. The more stable TRPs can report the TRP capabilities and requested access frame format of the temporary TRPs (along with their own TRP capabilities) to higher level network entity 1265. Such a deployment enables the implementation of a self-organizing network.

Figure 13:
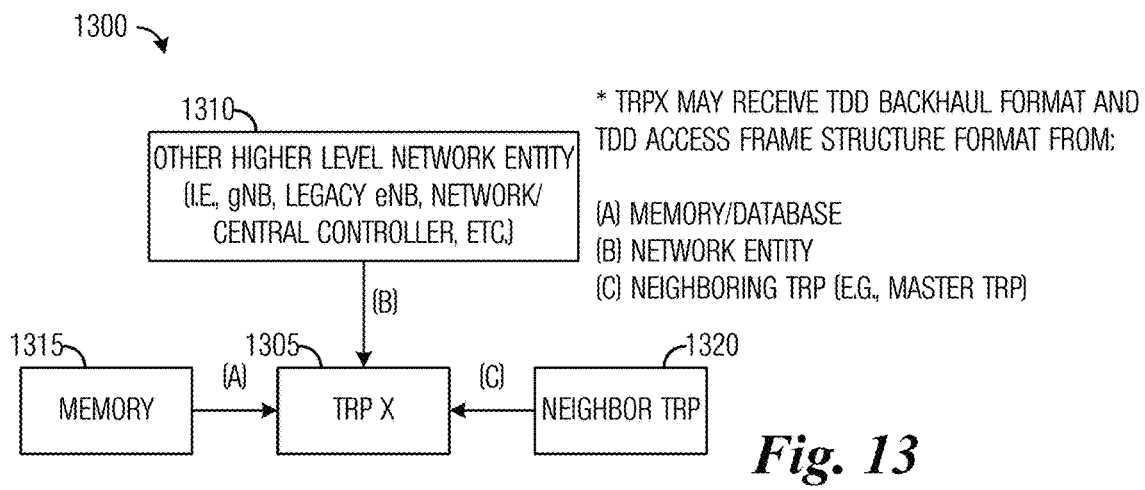
FIG. 13 illustrates a communications system highlighting an example signaling of backhaul link and TDD frame formats to TRPs according to example embodiments described herein.

FIG. 13 illustrates a communications system 1300 highlighting an example signaling of backhaul link and TDD frame formats to TRPs. Communications system 1300 includes a TRP (TRP X) 1305, a higher level network entity 1310, a memory 1315, and a neighbor TRP 1320. Higher level network entity 1310 may be a dedicated stand-alone backhaul and access link configuration determination entity. Alternatively, higher level network entity 1310 may be co-located with another network entity, such as a gNB, eNB, central controller, and so on.

TRP X 1305 may receive the backhaul link and TDD frame formats from a memory database (located in memory 1315, which may be local to TRP X 1305 or remote), higher level network 1310, or neighbor TRP 1320 (neighbor TRP 1320 may be a master TRP that is responsible for providing the backhaul link and TDD frame formats to the TRPs that it is controlling. As discussed previously, the backhaul link and TDD frame format may be signaled over a wireline or wireless connection (such as X2 or next generation X2 connections). A proprietary connection may be used if memory 1315 is local to TRP X 1305.

Parameters for TDD backhaul frame configurations may include a TDD frame format, if there is a fixed set of frame formats. Alternatively, backhaul frame length may be specified and each subframe type for the backhaul link may be specified for the duration of the backhaul frame.

Depending upon the capability of the TRP to receive and transmit to different neighboring TRPs at the same time (i.e., the TRP is self-interference capable across different sectors): for the TRPs that are self-interference capable across different sectors, each TRP may be assigned a different backhaul frame format (or subframes formats) for each neighboring TRP; or for the TRPs that are not self-interference capable across different sectors, each TRP may be assigned the same backhaul frame format (or subframes formats) for all neighboring TRPs.

Parameters for TDD access frame formats may include a TDD frame format, if there is a fixed set of frame formats, or subframe formats. Alternatively, access frame length may be specified and each subframe format or type for access may be individually specified for the duration of the access frame.

Figure 14:
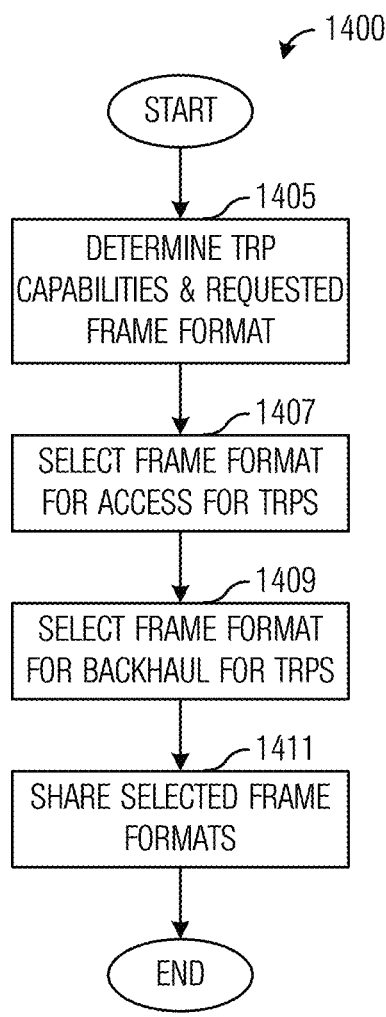
FIG. 14 illustrates a flow diagram of example operations occurring in a network entity that determines backhaul and access link configurations according to example embodiments described herein.

FIG. 14 illustrates a flow diagram of example operations 1400 occurring in a network entity that determines backhaul and access link configurations. Operations 1400 may be indicative of operations occurring in a network entity that determines backhaul and access link configurations.

Operations 1400 begin with the network entity determining TRP capabilities and requested frame format for access (block 1405). The TRP capabilities may include IAB capability and TRP self-interference capability, while the requested frame format may comprise a requested frame format for access indicator. The TRP capabilities and requested frame format may be received from each TRP served by the network entity. Alternatively, a TRP (e.g., a master TRP) may report its own TRP capability and requested frame format along with the TRP capabilities and requested frame format of TRPs that it controls. The network entity selects an access frame format (block 1407). The network entity selects the access frame format in accordance with the TRP capabilities and requested frame format. The network entity may select an access frame format for each TRP. Alternatively, the network entity may select an access frame format for a plurality of TRPs, based on a particular restriction imposed by their TRP capabilities and requested frame formats. The network entity selects a backhaul frame format for the TRPs (block 1409). The network entity selects the backhaul frame format in accordance with the TRP capabilities and requested frame formats, as well as the access frame format. The network entity may select a backhaul frame format for each TRP. Alternatively, the network entity may select a backhaul frame format for a plurality of TRPs, based on a particular restriction imposed by their TRP capabilities and requested frame formats. The network entity shares the selected frame formats (block 1411). The network entity may signal the selected frame formats to the TRPs. Alternatively, the network entity may signal the selected frame formats to a subset of the TRPs and the TRPs in the subset of TRPs may signal the selected frame formats to the remaining TRPs. Alternatively, the network entity may save the selected frame formats to a database, allowing the TRPs to access the selected frame formats as needed. Although the discussion presented above focuses on frame formats, the example embodiments are operable with subframe formats. Therefore, the discussion of frame formats should not be construed as being limiting to either the scope or the spirit of the example embodiments.

Figure 15:
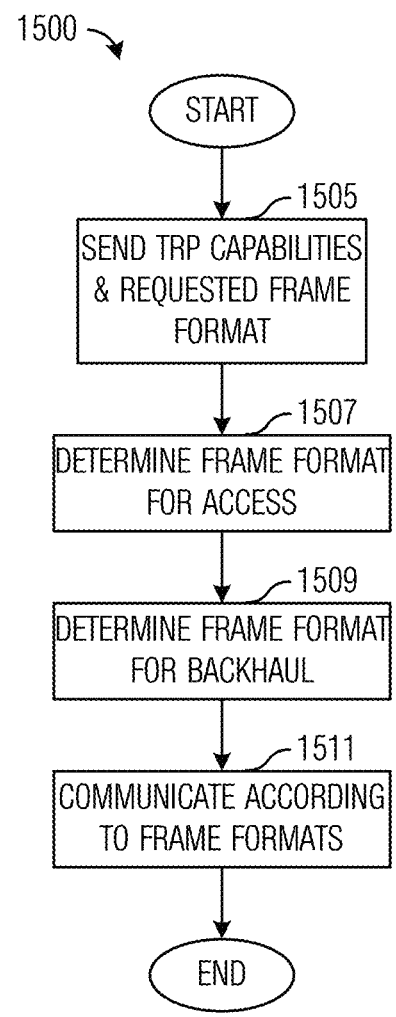
FIG. 15 illustrates a flow diagram of example operations occurring in a TRP communicating using access and backhaul links in an IAB deployment according to example embodiments described herein.

FIG. 15 illustrates a flow diagram of example operations 1500 occurring in a TRP communicating using access and backhaul links in an IAB deployment. Operations 1500 may be indicative of operations occurring in a TRP that is communicating using access and backhaul links in an IAB deployment.

Operations 1500 begin with the TRP sending TRP capabilities and requested frame format for access (block 15o5). The TRP may send the TRP capabilities and requested frame format to a network entity that determines backhaul and access link formats. Alternatively, the TRP may send the TRP capabilities and requested frame format to another TRP (e.g., a master TRP) and the other TRP sends the TRP capabilities and requested frame format to the network entity. In an embodiment, the TRP may be a master TRP and receives TRP capabilities and requested frame format from TRPs that it is controlling. In such an embodiment, the TRP sends its own TRP capabilities and requested frame format along with the TRP capabilities and requested frame format that it receives to the network entity. The TRP determines its access frame format (block 1507) and its backhaul frame format (block 1509). The access and backhaul frame formats may be received from the network entity. Alternatively, the access and backhaul frame formats may be retrieved from a database. Alternatively, the access and backhaul frame formats may be received from another TRP, such as a master TRP. The TRP communicates according to the access and backhaul frame formats (block 1511).

Figure 16:
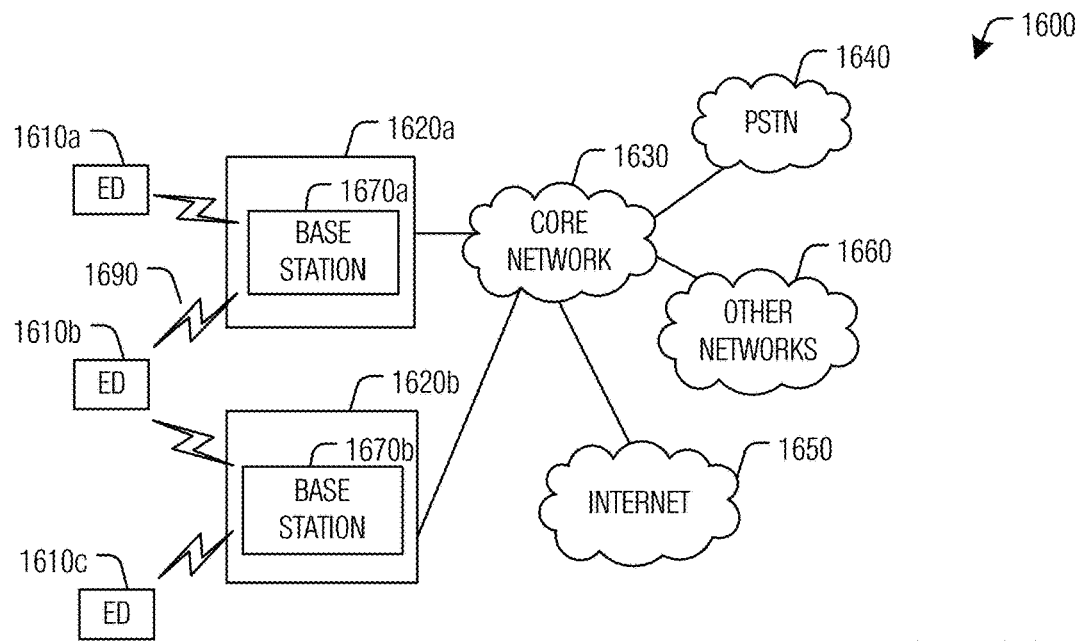
FIG. 16 illustrates an example communication system according to example embodiments described herein.

FIG. 16 illustrates an example communication system 1600. In general, the system 1600 enables multiple wireless or wired users to transmit and receive data and other content. The system 1600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1600 includes electronic devices (ED) 1610a-1610c, radio access networks (RANs) 1620a-1620b, a core network 1630, a public switched telephone network (PSTN) 1640, the Internet 1650, and other networks 1660. While certain numbers of these components or elements are shown in FIG. 16, any number of these components or elements may be included in the system 1600.

The EDs 1610a-1610c are configured to operate and/or communicate in the system 1600. For example, the EDs 1610a-1610c are configured to transmit and/or receive via wireless or wired communication channels. Each ED 1610a-1610c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1620a-1620b here include base stations 1670a-1670b, respectively. Each base station 1670a-1670b is configured to wirelessly interface with one or more of the EDs 1610a-1610c to enable access to the core network 1630, the PSTN 1640, the Internet 1650, and/or the other networks 1660. For example, the base stations 1670a-1670b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1610a-1610c are configured to interface and communicate with the Internet 1650 and may access the core network 1630, the PSTN 1640, and/or the other networks 1660.

In the embodiment shown in FIG. 16, the base station 1670a forms part of the RAN 1620a, which may include other base stations, elements, and/or devices. Also, the base station 1670b forms part of the RAN 1620b, which may include other base stations, elements, and/or devices. Each base station 1670a-1670b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1670a-1670b communicate with one or more of the EDs 1610a-1610c over one or more air interfaces 1690 using wireless communication links. The air interfaces 1690 may utilize any suitable radio access technology.

It is contemplated that the system 1600 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1620a-1620b are in communication with the core network 1630 to provide the EDs 1610a-1610c with voice, data, application, Voice over Internet Protocol (VoIP), or other services. Understandably, the RANs 1620a-1620b and/or the core network 1630 may be in direct or indirect communication with one or more other RANs (not shown). The core network 1630 may also serve as a gateway access for other networks (such as the PSTN 1640, the Internet 1650, and the other networks 1660). In addition, some or all of the EDs 1610a-1610c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1650.

Although FIG. 16 illustrates one example of a communication system, various changes may be made to FIG. 16. For example, the communication system 1600 could include any number of EDs, base stations, networks, or other components in any suitable configuration.

Figure 17A:
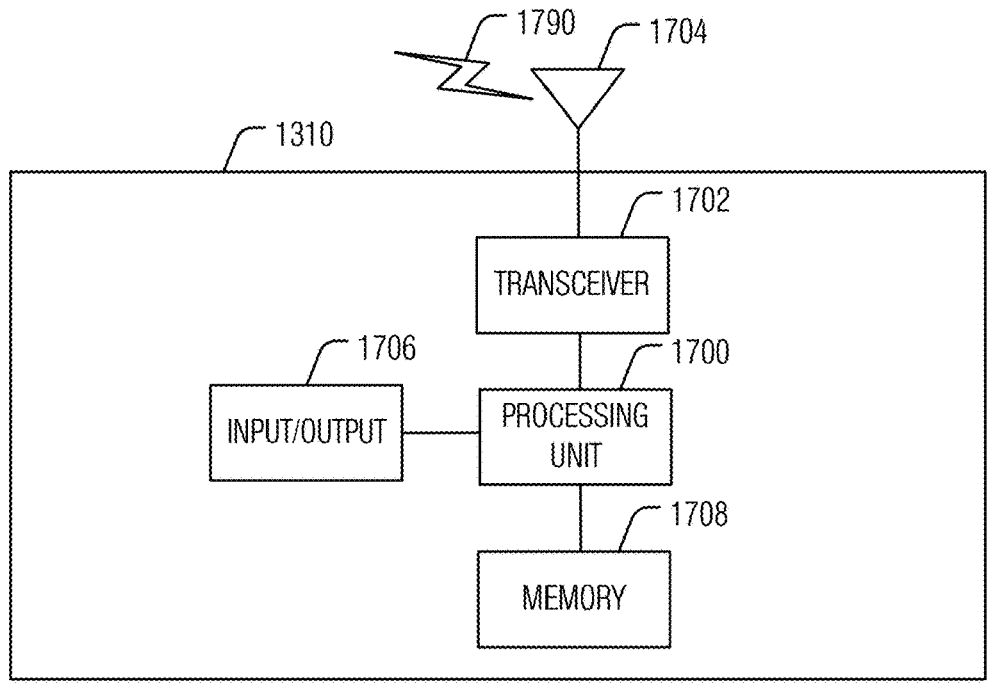
FIGS. 17A and 17B illustrate example devices that may implement the methods and teachings according to this disclosure.
Figure 17B:
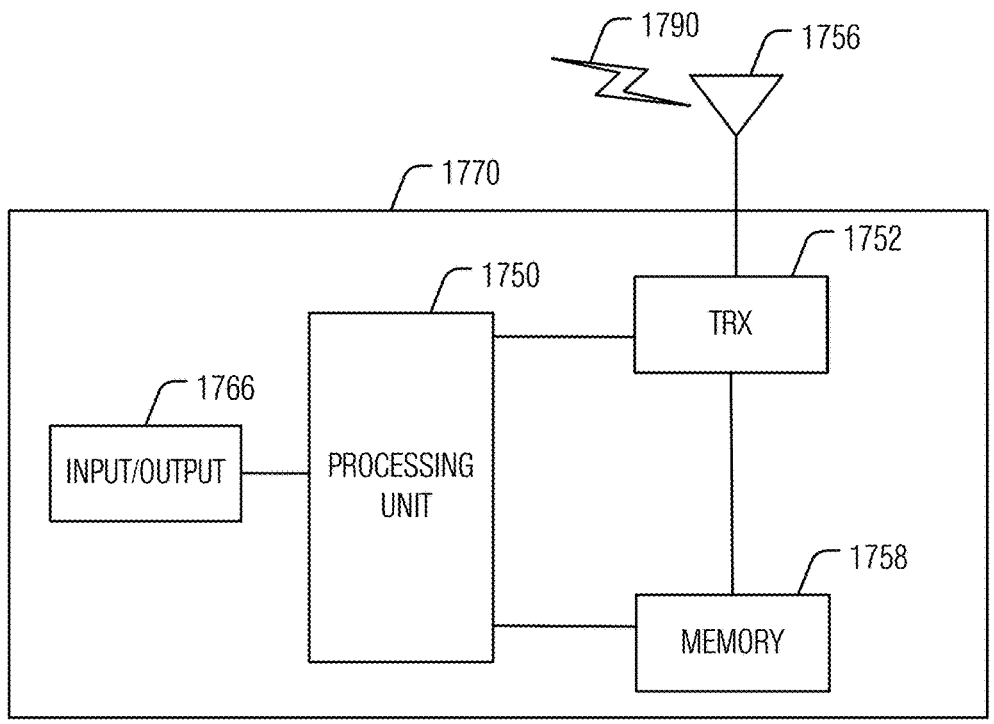

FIGS. 17A and 17B illustrate example devices that may implement the methods and teachings according to this disclosure. In particular, FIG. 17A illustrates an example ED 1710, and FIG. 17B illustrates an example base station 1770. These components could be used in the system 1300 or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input/output processing, or any other functionality enabling the ED 1710 to operate in the system 1600. The processing unit 1700 also supports the methods and teachings described in more detail above. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless or wired transmission and/or processing signals received wirelessly or by wire. Each antenna 1704 includes any suitable structure for transmitting and/or receiving wireless or wired signals. One or multiple transceivers 1702 could be used in the ED 1710, and one or multiple antennas 1704 could be used in the ED 1710. Although shown as a single functional unit, a transceiver 1702 could also be implemented using at least one transmitter and at least one separate receiver.

The ED 1710 further includes one or more input/output devices 1706 or interfaces (such as a wired interface to the Internet 1650). The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software or firmware instructions executed by the processing unit(s) 1700 and data used to reduce or eliminate interference in incoming signals. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transceiver 1752, which includes functionality for a transmitter and a receiver, one or more antennas 1756, at least one memory 1758, and one or more input/output devices or interfaces 1766. A scheduler, which would be understood by one skilled in the art, is coupled to the processing unit 1750. The scheduler could be included within or operated separately from the base station 1770. The processing unit 1750 implements various processing operations of the base station 1770, such as signal coding, data processing, power control, input/output processing, or any other functionality. The processing unit 1750 can also support the methods and teachings described in more detail above. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transceiver 1752 includes any suitable structure for generating signals for wireless or wired transmission to one or more EDs or other devices. Each transceiver 1752 further includes any suitable structure for processing signals received wirelessly or by wire from one or more EDs or other devices. Although shown combined as a transceiver 1752, a transmitter and a receiver could be separate components. Each antenna 1756 includes any suitable structure for transmitting and/or receiving wireless or wired signals. While a common antenna 1756 is shown here as being coupled to the transceiver 1752, one or more antennas 1756 could be coupled to the transceiver(s) 1752, allowing separate antennas 1756 to be coupled to the transmitter and the receiver if equipped as separate components. Each memory 1758 includes any suitable volatile and/or non-volatile storage and retrieval device(s). Each input/output device 1766 facilitates interaction with a user or other devices (network communications) in the network. Each input/output device 1766 includes any suitable structure for providing information to or receiving/providing information from a user, including network interface communications.

Figure 18:
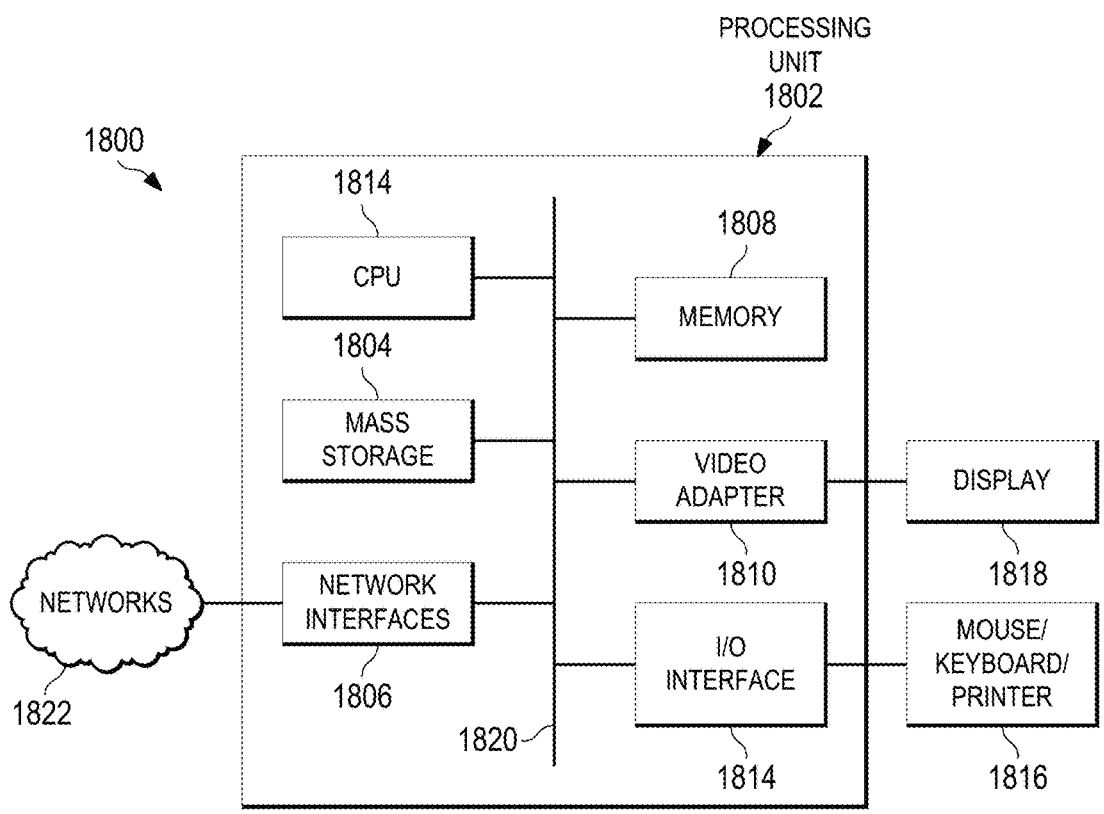
FIG. 18 is a block diagram of a computing system that may be used for implementing the devices and methods disclosed herein.

FIG. 18 is a block diagram of a computing system 1800 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1800 includes a processing unit 1802. The processing unit includes a central processing unit (CPU) 1814, memory 1808, and may further include a mass storage device 1804, a video adapter 1810, and an I/O interface 1812 connected to a bus 1820.

The bus 1820 may be one or more of any type of several bus architectures including a memory bus or memory controller, a peripheral bus, or a video bus. The CPU 1814 may comprise any type of electronic data processor. The memory 1808 may comprise any type of non-transitory system memory such as static random access memory (SRAM), dynamic random access memory (DRAM), synchronous DRAM (SDRAM), read-only memory (ROM), or a combination thereof. In an embodiment, the memory 1808 may include ROM for use at boot-up, and DRAM for program and data storage for use while executing programs.

The mass storage 1804 may comprise any type of non-transitory storage device configured to store data, programs, and other information and to make the data, programs, and other information accessible via the bus 1820. The mass storage 1804 may comprise, for example, one or more of a solid state drive, hard disk drive, a magnetic disk drive, or an optical disk drive.

The video adapter 1810 and the I/O interface 1812 provide interfaces to couple external input and output devices to the processing unit 1802. As illustrated, examples of input and output devices include a display 1818 coupled to the video adapter 1810 and a mouse/keyboard/printer 1816 coupled to the I/O interface 1812. Other devices may be coupled to the processing unit 1802, and additional or fewer interface cards may be utilized. For example, a serial interface such as Universal Serial Bus (USB) (not shown) may be used to provide an interface for an external device.

The processing unit 1802 also includes one or more network interfaces 1806, which may comprise wired links, such as an Ethernet cable, and/or wireless links to access nodes or different networks. The network interfaces 1806 allow the processing unit 1802 to communicate with remote units via the networks. For example, the network interfaces 1806 may provide wireless communication via one or more transmitters/transmit antennas and one or more receivers/receive antennas. In an embodiment, the processing unit 1802 is coupled to a local-area network 1822 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a providing unit/module, a selecting unit/module, and/or a signaling unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for supporting beamformed backhaul communications, the method comprising:
   selecting, by a network entity in accordance with transmit-receive point (TRP) capabilities of a first TRP, first formats of first subframes supporting access communications at the first TRP;
   selecting, by the network entity in accordance with TRP capabilities of a second TRP, second formats of second subframes supporting access communications at the second TRP;
   selecting, by the network entity in accordance with the TRP capabilities of the first TRP and the second TRP, a set of formats for supporting backhaul communications between the first TRP and the second TRP, the set of formats including at least one format from each of the first formats of the first subframes and the second formats of the second subframes; and
   signaling, by the network entity, indications of the first formats of the first subframes, the second formats of the second subframes, and the set of formats to the first TRP and the second TRP.

2. The method of claim 1, wherein the TRP capabilities of each of the first and second TRPs comprise at least one of self-interference cancellation capability, or integrated access and backhaul (IAB) capability.

3. The method of claim 1, wherein selecting the set of formats for supporting backhaul communications between the first TRP and the second TRP is also in accordance with at least one of first requested formats of subframes supporting access communications of the first TRP or second requested formats of subframes supporting access communications of the second TRP.

4. The method of claim 1, wherein:
selecting the first formats is also in accordance with first requested formats of subframes supporting access communications of the first TRP; and
selecting the second formats is also in accordance with second requested formats of subframes supporting access communications of the second TRP.

5. The method of claim 1, wherein the first and second TRPs are self-interference cancellation capable within a single sector, and wherein selecting the set of formats includes selecting all formats in each of the first formats of the first subframes and the second formats of the second subframes for inclusion in the set of formats.

6. The method of claim 1, wherein one of the first or second TRPs is self-interference cancellation incapable within a single sector, and wherein selecting the set of formats includes selecting formats that correspond to the one of the first or second TRPs that is self-interference cancellation incapable.

7. The method of claim 1, wherein the first and second TRPs are self-interference cancellation incapable within a single sector, and wherein selecting the set of formats includes selecting conflicting formats of the first formats and the second formats.

8. The method of claim 1, wherein the TRP capabilities of each of the first and second TRPs further comprise access and backhaul multiplexing in at least one of a time domain, a frequency domain, or a space domain.

9. A network entity comprising:
a non-transitory memory storage comprising instructions; and
one or more processors in communication with the non-transitory memory storage, wherein the one or more processors execute the instructions to:
select in accordance with transmit-receive point (TRP) capabilities of a first TRP, first formats of first subframes supporting access communications at the first TRP;
select in accordance with TRP capabilities of a second TRP, second formats of second subframes supporting access communications at the second TRP;
select in accordance with the TRP capabilities of the first TRP and the second TRP, a set of formats for supporting backhaul communications between the first TRP and the second TRP, the set of formats including at least one format from each of the first formats of the first subframes and the second formats of the second subframes; and
signal indications of the first formats of the first subframes, the second formats of the second subframes, and the set of formats to the first TRP and the second TRP.

10. The network entity of claim 9, wherein the TRP capabilities of each of the first and second TRPs comprise at least one of self-interference cancellation capability, or integrated access and backhaul (IAB) capability.

11. The network entity of claim 9, wherein selecting the set of formats for supporting backhaul communications between the first TRP and the second TRP is also in accordance with at least one of first requested formats of subframes supporting access communications of the first TRP or second requested formats of subframes supporting access communications of the second TRP.

12. The network entity of claim 9, wherein selecting the first formats is also in accordance with first requested formats of subframes supporting access communications of the first TRP, and wherein selecting the second formats is also in accordance with second requested formats of subframes supporting access communications of the second TRP.

13. The network entity of claim 9, wherein the first and second TRPs are self-interference cancellation capable within a single sector, and wherein selecting the set of formats includes selecting all formats in each of the first formats of the first subframes and the second formats of the second subframes for inclusion in the set of formats.

14. The network entity of claim 9, wherein one of the first or second TRPs is self-interference cancellation incapable within a single sector, and wherein selecting the set of formats includes selecting formats that correspond to the one of the first or second TRPs that is self-interference cancellation incapable.

15. The network entity of claim 9, wherein the first and second TRPs are self-interference cancellation incapable within a single sector, and wherein selecting the set of formats includes selecting conflicting formats of the first formats and the second formats.

16. The network entity of claim 9, wherein the TRP capabilities of each of the first and second TRPs further comprise access and backhaul multiplexing in at least one of a time domain, a frequency domain, or a space domain.

17. A non-transitory computer-readable media storing computer instructions for supporting beamformed backhaul communications, that when executed by one or more processors, cause the one or more processors to perform steps of:
select in accordance with transmit-receive point (TRP) capabilities of a first TRP, first formats of first subframes supporting access communications at the first TRP;
select in accordance with TRP capabilities of a second TRP, second formats of second subframes supporting access communications at the second TRP;
select in accordance with the TRP capabilities of the first TRP and the second TRP, a set of formats for supporting backhaul communications between the first TRP and the second TRP, the set of formats including at least one format from each of the first formats of the first subframes and the second formats of the second subframes; and
signal indications of the first formats of the first subframes, the second formats of the second subframes, and the set of formats to the first TRP and the second TRP.

18. The non-transitory computer-readable media of claim 17, wherein the first and second TRPs are self-interference cancellation capable within a single sector, and wherein selecting the set of formats includes selecting all formats in each of the first formats of the first subframes and the second formats of the second subframes for inclusion in the set of formats.

19. The non-transitory computer-readable media of claim 17, wherein one of the first or second TRPs is self-interference cancellation incapable within a single sector, and wherein selecting the set of formats includes selecting formats that correspond to the one of the first or second TRPs that is self-interference cancellation incapable.

20. The non-transitory computer-readable media of claim 17, wherein the first and second TRPs are self-interference cancellation incapable within a single sector, and wherein selecting the set of formats includes selecting conflicting formats of the first formats and the second formats.

\* \* \* \* \*